US012609077B2

(12) United States Patent
Yuan et al.

(10) Patent No.: US 12,609,077 B2
(45) Date of Patent: Apr. 21, 2026

(54) DISPLAY SUBSTRATE AND DISPLAY DEVICE

(71) Applicants: HEFEI BOE JOINT TECHNOLOGY CO., LTD., Anhui (CN); BOE TECHNOLOGY GROUP CO., LTD., Beijing (CN)

(72) Inventors: Can Yuan, Beijing (CN); Yongqian Li, Beijing (CN); Zhidong Yuan, Beijing (CN); Cheng Xu, Beijing (CN); Dacheng Zhang, Beijing (CN); Dandan Zhou, Beijing (CN); Liu Wu, Beijing (CN); Luke Ding, Beijing (CN); Xiuting Liu, Beijing (CN)

(73) Assignees: HEFEI BOE JOINT TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 23 days.

(21) Appl. No.: 18/558,500

(22) PCT Filed: Oct. 28, 2022

(86) PCT No.: PCT/CN2022/128272

§ 371 (c)(1),
(2) Date: Nov. 1, 2023

(87) PCT Pub. No.: WO2024/087173

PCT Pub. Date: May 2, 2024

(65) Prior Publication Data

US 2025/0104626 A1 Mar. 27, 2025

(51) Int. Cl.
*G09G 3/3233* (2016.01)
*G09G 3/32* (2016.01)

(52) U.S. Cl.
CPC ............ *G09G 3/3233* (2013.01); *G09G 3/32* (2013.01); *G09G 2300/0426* (2013.01);
(Continued)

(58) Field of Classification Search
None
See application file for complete search history.

(56) References Cited

U.S. PATENT DOCUMENTS 9,995,976 B2 6/2018 Jia et al.
11,074,864 B1 7/2021 Lu et al.
(Continued)

FOREIGN PATENT DOCUMENTS

CN 101630479 A 1/2010
CN 101740581 A 6/2010
(Continued)

OTHER PUBLICATIONS

International Search Report and Written Opinion for Application No. PCT/CN2022/071888, dated 1. Jun. 16, 2023, 7 Pages.
(Continued)

*Primary Examiner* — Andre L Matthews
(74) *Attorney, Agent, or Firm* — BROOKS KUSHMAN P.C.

(57) ABSTRACT

A display substrate and a display device. The display substrate includes a driving circuit layer, a first scanning line and a second scanning line. The driving circuit layer includes pixel units arranged in an array form, each pixel unit includes a plurality of sub-pixels, at least one sub-pixel includes a pixel driving circuit, the pixel driving circuit includes a first transistor and a second transistor, an active pattern of the first transistor includes a first channel region, an active pattern of the second transistor includes a second channel region, the first channel region is located on a side of the first scanning line away from the second scanning
(Continued)

line, and the second channel region is located on a side of the second scanning line away from the first scanning line.

18 Claims, 13 Drawing Sheets

(52) U.S. Cl.
CPC . *G09G 2300/0842* (2013.01); *G09G 2310/08* (2013.01); *G09G 2320/0233* (2013.01); *G09G 2330/021* (2013.01)

(56) References Cited

U.S. PATENT DOCUMENTS

| | | | |
|---|---|---|---|
| 11,114,030 | B1 | 9/2021 | Lu et al. |
| 11,355,075 | B2 | 6/2022 | Kang et al. |
| 11,804,181 | B2 | 10/2023 | Cho et al. |
| 12,057,068 | B2 | 8/2024 | Sakaguchi et al. |
| 2009/0322730 | A1 | 12/2009 | Yamamoto et al. |
| 2011/0199357 | A1 | 8/2011 | Chung |
| 2011/0266535 | A1 | 11/2011 | Li et al. |
| 2015/0115292 | A1 | 4/2015 | Jeon et al. |
| 2016/0180770 | A1 | 6/2016 | Duan et al. |
| 2017/0108745 | A1 | 4/2017 | Jia et al. |
| 2017/0270867 | A1 | 9/2017 | Zhu et al. |
| 2018/0261627 | A1 | 9/2018 | An |
| 2018/0357964 | A1 | 12/2018 | Shin et al. |
| 2019/0005877 | A1 | 1/2019 | Dong et al. |
| 2019/0051243 | A1 | 2/2019 | Li et al. |
| 2019/0371243 | A1 | 12/2019 | Yang et al. |
| 2019/0385520 | A1 | 12/2019 | Chen et al. |
| 2020/0234649 | A1 | 7/2020 | Fan et al. |
| 2021/0012720 | A1 | 1/2021 | Kang et al. |
| 2021/0057450 | A1 | 2/2021 | Wu et al. |
| 2021/0091161 | A1 | 3/2021 | Baek et al. |
| 2021/0166614 | A1 | 6/2021 | Yao et al. |
| 2021/0183977 | A1 | 6/2021 | Xiao et al. |
| 2021/0257440 | A1 | 8/2021 | Long et al. |
| 2021/0272517 | A1 | 9/2021 | Chen et al. |
| 2021/0328002 | A1 | 10/2021 | Lee et al. |
| 2021/0376003 | A1 | 12/2021 | Xu et al. |
| 2022/0068182 | A1 | 3/2022 | Lee et al. |
| 2022/0157856 | A1 | 5/2022 | Choung et al. |
| 2022/0165217 | A1* | 5/2022 | Lee ...................... H10K 59/353 |
| 2022/0173189 | A1 | 6/2022 | Kim et al. |
| 2022/0180816 | A1 | 6/2022 | Yuan et al. |
| 2022/0246086 | A1* | 8/2022 | Son .......................... G09G 3/32 |
| 2022/0352296 | A1 | 11/2022 | Yi et al. |
| 2022/0367596 | A1 | 11/2022 | Chen et al. |
| 2023/0005421 | A1 | 1/2023 | Sakaguchi et al. |
| 2023/0021680 | A1 | 1/2023 | Li et al. |
| 2023/0030891 | A1 | 2/2023 | Du et al. |
| 2023/0091012 | A1 | 3/2023 | Yuan et al. |
| 2023/0095733 | A1 | 3/2023 | Yuan et al. |
| 2023/0196975 | A1 | 6/2023 | Zong et al. |
| 2023/0351958 | A1 | 11/2023 | Liu et al. |
| 2023/0410759 | A1 | 12/2023 | Zong et al. |
| 2024/0119897 | A1 | 4/2024 | Zhang et al. |

FOREIGN PATENT DOCUMENTS

| | | | |
|---|---|---|---|
| CN | 102842283 | A | 12/2012 |
| CN | 103035195 | A | 4/2013 |
| CN | 103943067 | A | 7/2014 |
| CN | 105159001 | A | 12/2015 |
| CN | 105845081 | A | 8/2016 |
| CN | 106157896 | A | 11/2016 |
| CN | 106531074 | A | 3/2017 |
| CN | 106782339 | A | 5/2017 |
| CN | 108806582 | A | 11/2018 |
| CN | 108986749 | A | 12/2018 |
| CN | 109003583 | A | 12/2018 |
| CN | 109166896 | A | 1/2019 |
| CN | 109817157 | A | 5/2019 |
| CN | 110111738 | A | 8/2019 |
| CN | 209729911 | U | 12/2019 |
| CN | 111312160 | A | 6/2020 |
| CN | 111369946 | A | 7/2020 |
| CN | 111429842 | A | 7/2020 |
| CN | 111508977 | A | 8/2020 |
| CN | 111599846 | A | 8/2020 |
| CN | 111816123 | A | 10/2020 |
| CN | 112071882 | A | 12/2020 |
| CN | 112309345 | A | 2/2021 |
| CN | 112542437 | A | 3/2021 |
| CN | 112713157 | A | 4/2021 |
| CN | 113272963 | A | 8/2021 |
| CN | 113540172 | A | 10/2021 |
| CN | 113658995 | A | 11/2021 |
| CN | 113675252 | A | 11/2021 |
| CN | 113838421 | A | 12/2021 |
| CN | 114120905 | A | 3/2022 |
| CN | 114175257 | A | 3/2022 |
| CN | 114241996 | A | 3/2022 |
| CN | 114255704 | A | 3/2022 |
| CN | 114497143 | A | 5/2022 |
| CN | 114582288 | A | 6/2022 |
| CN | 114725181 | A | 7/2022 |
| CN | 114746932 | A | 7/2022 |
| CN | 114882838 | A | 8/2022 |
| CN | 114902320 | A | 8/2022 |
| CN | 115023755 | A | 9/2022 |
| CN | 115087956 | A | 9/2022 |
| JP | 2008197607 | A | 8/2008 |
| JP | 2009288748 | A | 12/2009 |
| WO | 2019024395 | A1 | 2/2019 |

OTHER PUBLICATIONS

International Search Report and Written Opinion for Application No. PCT/CN2022/071892 dated 2. Mar. 14, 2023, 7 Pages.
International Search Report and Written Opinion for Application No. PCT/CN2022/128241 dated 3. Jul. 6, 2023, 6 Pages.
International Search Report and Written Opinion for Application No. PCT/CN2022/128244 dated 4. Jun. 23, 2023, 6 Pages.
China Academic Journal Electronic Publishing House "Study on the Display Apparatus of OLED'S Driving Circuit" Chang Tianhai, Gao Yang, 2011, 6 Pages.
Non-Final Office Action for U.S. Appl. No. 18/558,247 dated Mar. 6, 2025. 21 pages.
Non-Final Office Action for U.S. Appl. No. 18/555,023 dated Apr. 9, 2025. 15 pages.
European Search Report for Application No. 22963155.1, Apr. 7, 2025, 10 pages.
Non-Final Office Action for U.S. Appl. No. 18/555,023 dated Oct. 12, 2023. 15 pages.
Non-Final Office Action for U.S. Appl. No. 18/558,247 dated Oct. 31, 2023. 21 pages.
European Search Report for Application No. 23881007.1 mailed Jul. 9, 2025, 10 pages.
Final Office Action for U.S. Appl. No. 18/555,023 dated Oct. 21, 2025. 29 pages.
Non-Final Office Action for U.S. Appl. No. 18/558,248 dated Feb. 5, 2026. 59 pages.

* cited by examiner

DISPLAY SUBSTRATE AND DISPLAY DEVICE

CROSS-REFERENCE TO RELATED APPLICATION

This application is the U.S. national phase of PCT Application No. PCT/CN2022/128272 filed on Oct. 28, 2022, which is incorporated herein by reference in its entirety.

TECHNICAL FIELD

The present disclosure relates to the field of display technologies, in particular to a display substrate and a display device.

BACKGROUND

With the continuous development of display technology, display products have been widely used, display products with high resolution and high refresh rate are becoming more and more popular. However, medium-sized and large-sized display products are not able to realize the function of products with high refresh rate due to the limitation of large load.

SUMMARY

The following is a summary of the subject matter described in detail herein. The summary is not intended to limit the scope of the claims.

In an aspect, the present disclosure provides a display substrate including:

- a base substrate;
- a driving circuit layer including pixel units arranged in an array form, at least one of the pixel units including a plurality of sub-pixels, where at least one of the sub-pixels includes a pixel driving circuit, and the pixel driving circuit includes a light-emitting element, a plurality of transistors and a storage capacitor; the plurality of transistors include a first transistor and a second transistor, and the first transistor is coupled to the second transistor;
- a plurality of scanning lines, where the plurality of scanning lines includes a first scanning line and a second scanning line, both the first scanning line and the second scanning line extend along a first direction and are arranged along a second direction, the first direction is an extension direction of sub-pixels in a row, and the second direction is an extension direction of sub-pixels in a column.

The plurality of transistors include one or more active patterns, and an active pattern of each transistor includes a channel region and a conductive region. An active pattern of the first transistor includes a first channel region, an active pattern of the second transistor includes a second channel region, the first channel region is located on a side of the first scanning line away from the second scanning line, and the second channel region is located on a side of the second scanning line away from the first scanning line.

Optionally, the display substrate further includes a plurality of signal lines, and the plurality of signal lines includes a first signal line and a second signal line. The first signal line is coupled to a first electrode of the first transistor, the second signal line is coupled to a first electrode of the second transistor, and the first transistor T1 is configured to transmit a voltage signal of the first signal line to a second electrode of the first transistor under control of a first scanning line signal. The second transistor is configured to transmit a voltage signal of the second signal line to a second electrode of the second transistor under control of a second scanning line signal. The second electrode of the first transistor and the second electrode of the second transistor are coupled to a first node.

Optionally, the plurality of scanning lines further includes a third scanning line, and the plurality of signal lines further includes a power source line. The third scanning line includes a first branch scanning line extending along the first direction and a second branch scanning line extending along the second direction, the first branch scanning line is coupled to the second branch scanning line. The plurality of transistors further includes a third transistor and a driving transistor. The storage capacitor includes a first electrode plate and a second electrode plate. A second electrode of the third transistor, a gate electrode of the driving transistor and the first electrode plate of the storage capacitor are coupled to a second node, a gate electrode of the third transistor is coupled to the third scanning line, and a first electrode of the third transistor is coupled to the first node. The third transistor is configured to transmit a voltage of the first node to the second node under control of a third scanning line signal. For sub-pixels in a same row, the first branch scanning line is located on a side of the first scanning line away from the second scanning line.

Optionally, the plurality of transistors further includes a fourth transistor and a fifth transistor, the plurality of scanning lines further includes a light-emitting scanning line and a fourth scanning line, and the plurality of signal lines further includes a third signal line. The light-emitting scanning line extends along the first direction. A gate electrode of the fourth transistor is coupled to the light-emitting scanning line, a first electrode of the fourth transistor is coupled to the power source line, and a second electrode of the fourth transistor is coupled to a first electrode of the driving transistor. The fourth transistor is configured to transmit a voltage signal from the power source line to a second electrode of the driving transistor under control of a light-emitting scanning line signal. A gate electrode of the fifth transistor is coupled to the fourth scanning line, a first electrode of the fifth transistor is coupled to the third signal line, and a second electrode of the fifth transistor is coupled to the light-emitting element. The fifth transistor is configured to transmit a voltage signal of the third signal line to the light-emitting element under control of a fourth scanning line signal.

Optionally, the power source line includes a first power source line extending along the first direction and a second power source line extending along the second direction, and the first power source line is coupled to the second power source line. For the sub-pixels in the same row, the first power source line is located on a side of the light-emitting scanning line away from the first scanning line. The third signal line includes a first sub-line extending along the first direction and a second sub-line extending along the second direction, and the first sub-line is coupled to the second sub-line. The fourth scanning line extends along the first direction, and for the sub-pixels in the same row, the fourth scanning line is located on a side of the first power source line away from the light-emitting scanning line. The first sub-line is located on a side of the fourth scanning line away from the first scanning line.

Optionally, pixel driving circuits of the plurality of sub-pixels are arranged in M*N, where M and N are each a positive integer greater than or equal to 1, and at least two sub-pixels in a same column are coupled to a same first signal line.

Optionally, the display substrate further includes a plurality of control regions, and at least one control region includes at least one repeat unit. The third scanning line is coupled to a gate electrode of a third transistor in each repeat unit for controlling the turn-on or turn-off of the third transistor in each repeat unit in a corresponding control region. Along the first direction, in a same control region, first branch scanning lines coupled to sub-pixels respectively in the repeat unit are coupled to each other, and first branch scanning lines are disconnected from each other between the control regions.

Optionally, an orthographic projection of the second power source line onto the base substrate does not overlap an orthographic projection of the first branch scanning line onto the base substrate.

Optionally, an orthographic projection of the first power source line onto the base substrate overlaps an orthographic projection of the second branch scanning line onto the base substrate.

Optionally, in a direction perpendicular to the base substrate, the driving circuit layer includes an active layer, a first conductive layer, a second conductive layer, a third conductive layer and a fourth conductive layer which are arranged sequentially on the base substrate. The active layer includes the active patterns of the plurality of transistors, and the active pattern includes the channel region and the conductive region. The first conductive layer includes gate electrodes of the plurality of transistors, the second branch scanning line and the second sub-line. The second conductive layer includes a second electrode plate of the storage capacitor. The third conductive layer includes the first scanning line, the second scanning line, the first branch scanning line, the light-emitting scanning line, the fourth scanning line, the second signal line, the first power source line and the first sub-line. The fourth conductive layer includes the first signal line and the second power source line.

Optionally, a spacing between the second signal line and the second scanning line is greater than or equal to a spacing between the first scanning line and the second scanning line.

Optionally, an interlayer insulation layer is arranged between the second conductive layer and the third conductive layer, the interlayer insulation layer includes a first via-hole structure, and the first via-hole structure includes a first via-hole and a second via-hole. An orthographic projection of a gate electrode of the first transistor onto the base substrate at least partially overlaps an orthographic projection of the first scanning line onto the base substrate at a first overlapping region, and an orthographic projection of the first via-hole onto the base substrate is in the first overlapping region. An orthographic projection of a gate electrode of the second transistor onto the base substrate at least partially overlaps an orthographic projection of the second scanning line onto the base substrate at a second overlapping region, and an orthographic projection of the second via-hole onto the base substrate is in the second overlapping region. A distance between the first via-hole and the second via-hole is greater than a distance between the first scanning line and the second scanning line.

Optionally, the first branch scanning line includes a first connection member, and for sub-pixels in a same row, the first connection member is located on a side of the first branch scanning line away from the light-emitting scanning line. The first via-hole structure includes a ninth via-hole, the second branch scanning line is coupled to the first branch scanning line through the ninth via-hole, and an orthographic projection of the ninth via-hole onto the base substrate is within an orthographic projection of the first connection member onto the base substrate.

Optionally, the first electrode plate of the storage capacitor includes a first electrode sub-plate and a second electrode sub-plate, the first electrode sub-plate is located in the first conductive layer, and the second electrode sub-plate is located in the third conductive layer. The third conductive layer includes a second connection member. The first via-hole structure includes a fifteenth via-hole and a sixteenth via-hole, the second electrode sub-plate is coupled to the first electrode sub-plate through the fifteenth via-hole, and the second electrode sub-plate is coupled to the second node through the sixteenth via-hole. Orthographic projections of the fifteenth via-hole and the sixteenth via-hole onto the base substrate are within an orthographic projection of the second connection member onto the base substrate.

Optionally, the display substrate further includes a first organic layer arranged on a side of the third conductive layer away from the base substrate, the first organic layer includes a second via-hole structure, the first via-hole structure includes a twelfth via-hole, and the second via-hole structure includes an eighteenth via-hole. The first signal line is coupled to a first electrode of the first transistor through the twelfth via-hole and the eighteenth via-hole, and there is an overlapping region in orthographic projections of the eighteenth via-hole and the twelfth via-hole onto the base substrate. The third conductive layer further includes a third connection member, and an orthographic projection of the third connection member onto the base substrate covers the orthographic projections of the eighteenth via-hole and the twelfth via-hole onto the base substrate.

Optionally, the second via-hole structure includes a twentieth via-hole, and the second power source line is coupled to the first power source line through the twentieth via-hole. The first power source line includes a fourth connection member, and for the sub-pixels in the same row, the fourth connection member is located on a side of the first power source line close to the fourth scanning line. An orthographic projection of the twentieth via-hole onto the base substrate partially overlaps an orthographic projection of the fourth connection member onto the base substrate.

Optionally, a width of the twentieth via-hole along the first direction is less than a width of the twentieth via-hole along the second direction.

Optionally, the display substrate includes a light-emitting element layer on a side of the fourth conductive layer away from the base substrate, the light-emitting element layer includes a first electrode layer, a pixel definition layer, a light-emitting functional layer and a second electrode layer, and the first electrode layer includes a plurality of first electrodes corresponding to the plurality of sub-pixels respectively.

Optionally, the display substrate further includes a second organic layer arranged on a side of the fourth conductive layer away from the base substrate, the second organic layer includes a fourth via-hole structure, the fourth via-hole structure includes a twenty-first via-hole, and the plurality of first electrodes are coupled to the seventh connection member through the twenty-first via-hole, to enable the second electrode plate of the storage capacitor to be coupled to a second electrode of the driving transistor.

Optionally, the fourth conductive layer further includes an auxiliary electrode, the auxiliary electrode includes an eighth connection member, and the eighth connection member is located on a left side of the auxiliary electrode from a top view of the display substrate.

Optionally, the pixel definition layer includes a first pixel definition layer and a second pixel definition layer, the first pixel definition layer is arranged in the first direction and extends along the second direction, the first pixel definition layer and the second pixel definition layer define an opening region of each sub-pixel, and a light-emitting region of each sub-pixel is located in the opening region. A height of the second pixel definition layer is greater than a height of the first pixel definition layer in the direction perpendicular to the base substrate.

Optionally, the plurality of sub-pixels are divided into a plurality of repeat units arranged in an array form, each repeat unit includes two sub-units arranged along the first direction, and each sub-unit includes a plurality of sub-pixels arranged along the first direction. Within the repeat unit, pixel definition structures of adjacent sub-pixels in two adjacent sub-units are an integral structure.

Optionally, within the plurality of repeat units, the first pixel definition layer includes a first pattern, and the second pixel definition layer includes a second pattern, and an orthographic projection of the second pattern onto the base substrate covers an orthographic projection of the first pattern onto the base substrate.

Optionally, the fourth via-hole structure includes a twenty-second via-hole, the second pattern includes a twenty-third via-hole, and the second electrode layer is coupled to the auxiliary electrode through the twenty-third via-hole and the twenty-second via-hole. An orthographic projection of the twenty-third via-hole onto the base substrate covers an orthographic projection of the twenty-second via-hole onto the base substrate.

Optionally, the first electrode layer includes a ninth connection member, and an orthographic projection of the eighth connection member onto the base substrate is within an orthographic projection of the ninth connection member onto the base substrate. An orthographic projection of the eighth connection member onto the base substrate covers the twenty-second via-hole.

Optionally, the twenty-third via-hole is located at a center of the second pattern.

Based on the above-mentioned technical solution of the display substrate, the present disclosure, in another aspect, provides a display device including the above-mentioned display substrate.

BRIEF DESCRIPTION OF THE DRAWINGS

The following drawings are provided to facilitate the understanding of the present disclosure, and constitute a portion of the present disclosure. These drawings and the following embodiments are for illustrative purposes only, but shall not be construed as limiting the present disclosure. In the drawings.

Figure 1:
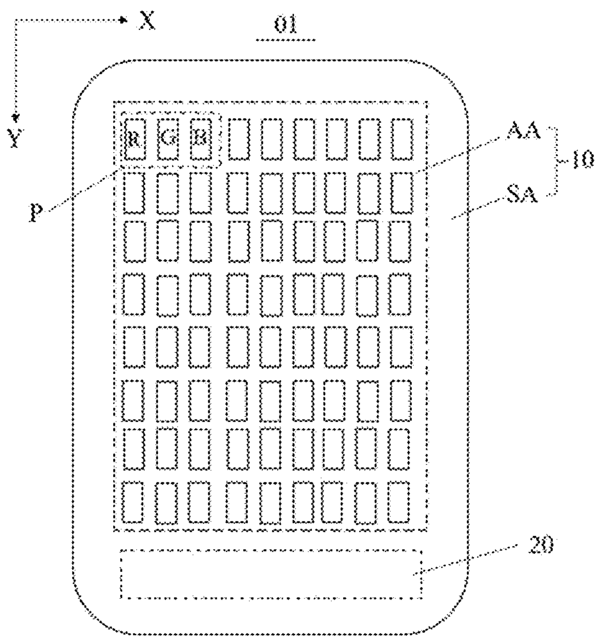
FIG. 1 is a partially planar view of a display device.

| Reference Numerals list: | | |
|---|---|---|
| 01-display device; | 10-display substrate; | 20-display driving circuit; |
| 101-base substrate; | 102-buffer layer; | 103-active layer; |
| 104-gate insulation layer; | 105-first conductive layer; | 106-first insulation layer; |
| 107-second conductive layer; | 108-interlayer insulation layer; | 109-third conductive layer; |
| 110-first organic layer; | 111-first passivation layer; | 112-fourth conductive layer; |
| 113-second passivation layer; | 114-second organic layer; | 115-first electrode layer; |
| 116-light-emitting functional layer; | 117-second electrode layer; | 118-first pixel definition layer; |
| 119-second pixel definition layer; | 120-pixel definition layer. | |

DETAILED DESCRIPTION

In order to further explain the display substrate and the display device in the embodiments of the present disclosure, a detailed description will be given below with reference to the accompanying drawings.

In order that the objects, technical solutions and advantages of the embodiments of the present disclosure become more apparent, the present disclosure is described in a clear and complete manner in conjunction with the drawings and embodiments. The following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as “first”, “second”, “third” and “fourth” used in the specification and claims are merely used to differentiate different components rather than to represent any order, number or importance.

In the present disclosure, such words as “center”, “on/above”, “under/below”, “left”, “inner” may be used to indicate directions or positions of components as viewed in the drawings, and they are merely used to facilitate the description in the present disclosure, rather than to indicate or imply that a device or member must be arranged or operated at a specific position. A positional relationship of the components is appropriately changed according to a direction in which each component is described. Therefore, the words described in the specification are not limited and may be replaced as appropriate according to circumstances.

In the present disclosure, unless explicitly specified or defined otherwise, terms such as “connected”, “connection” and “coupled” should be to be construed in a broad sense. For example, the term “connected” or “coupled” are used when describing some embodiments, it may be a fixed connection, or a detachable connection, or integral connection; it may be a mechanical connection or an electrical connection; it may be a direct connection, or an indirect connection via an intermediate medium, or an interior connection of two elements. Such words as “include” or “including” intends to indicate that an element or object before the word contains an element or object or equivalents thereof listed after the word, without excluding any other element or object. The meanings of these words may be understood by a person skilled in the art according to the practical need.

In the present disclosure, a transistor refers to an element including at least three terminals of a gate electrode, a drain electrode and a source electrode. The transistor has a channel region between a drain electrode (drain electrode terminal, drain region or drain electrode) and a source electrode (source electrode terminal, source region or source electrode), and a current is capable of flowing through the drain electrode, the channel region and the source electrode. Note that, in the specification, the channel region refers to a region through which the current mainly flows.

In the present disclosure, the first electrode may be a drain electrode and the second electrode may be a source electrode, or the first electrode may be a source electrode and the second electrode may be a drain electrode. The functions of the “source electrode” and the “drain electrode” are sometimes interchanged in the case of transistors with opposite polarities or in the case of a change in a direction of current during operation of a circuit, etc. Thus, in the present specification, “source electrode” and “drain electrode” may be interchanged.

In the present disclosure, “electrically connected” includes a case where components are connected to each other through an element having some electrical effect. The “element having some electrical effect” is not particularly limited as long as it can transmit and receive an electrical signal between the components to be connected. Examples of the “element having some electrical effect” not only include electrodes and wiring, but also include switching elements such as transistors, resistors, inductors, capacitors, other elements having various functions, etc. A scale of the drawings in the present disclosure may be, but not limited to, taken as a reference in an actual process. For example, a width-to-length ratio of a channel, a thickness of each film layer and a spacing between film layers, and a width of a signal line and a spacing between signal lines may be adjusted according to actual needs. The quantity of pixels in the display substrate and the quantity of sub-pixels in each pixel is also not limited to the quantity shown in the drawings, and the drawings described in the present disclosure are only schematic.

In the present disclosure, “film” and “layer” are interchangeable. For example, sometimes a “conductive layer” may be exchanged for a “conductive film”. Also, sometimes, the “insulation film” may be replaced with an “insulation layer”. The expression “about” in the present disclosure refers to a value within a range that a limit thereof is not strictly defined and allows for process and measurement errors.

Some embodiments of the present disclosure provide a display device. It is noted that the display device includes any product or member having a display function, such as a television, a display, a digital photo frame, a mobile phone, a tablet computer, and the display device further includes a flexible circuit board, a printed circuit board and a backplane, etc.

FIG. 1 is a planar view of a display device according to an embodiment of the present disclosure. As shown in FIG. 1, a display device 01 includes a display substrate 10 including a display region AA and a non-display region SA. The non-display region SA may be located on at least one side of the display region AA, for example, the non-display region SA may be arranged surrounding the display region AA.

The display device may be an organic light-emitting diode (OLED) display panel, a quantum dot light-emitting diode (QLED) display panel, and a micro light-emitting diode (including miniLED or microLED) display panel, etc.

In an exemplary embodiment, the display substrate 10 may be of a rectangular, curved, or another irregular shape. For example, as shown in FIG. 1, the display substrate is of a rectangular shape having curved corners. For convenience of illustration, the display region AA is schematically provided in a rectangular shape, and extension directions of two edges perpendicular to each other are taken as a first direction (X-axis direction) and a second direction (Y-axis direction), respectively.

The display device 01 may further include other components such as a display driver integrated circuit (DDIC) 20 and the like. The DDIC 20 is coupled to, e.g., may be bonded to, the display substrate 10 and is configured to apply a data signal to the display substrate 10.

In an exemplary embodiment, the display substrate 10 includes a plurality of pixel units P arranged in an array form, and at least one pixel unit P includes a plurality of sub-pixels. The plurality of sub-pixels may include a first sub-pixel SP1 for emitting light in a first color, a second sub-pixel SP2 for emitting light in a second color, a third sub-pixel SP3 for emitting light in a third color, and a fourth sub-pixel SP4 for emitting light in a fourth color. Illustratively, the first sub-pixel SP1 may be a red sub-pixel (R) that emits a red light, the second sub-pixel SP2 may be a blue sub-pixel (B) that emits a blue light, the third sub-pixel SP3 may be a green sub-pixel (G) that emits a green light, and the fourth sub-pixel SP4 may be a white sub-pixel (W) that emits a white light. In an exemplary embodiment, each pixel unit P may include three sub-pixels (e.g., including RGB) or four sub-pixels (e.g., RGBW), which will not be particularly defined herein. A case where each pixel unit includes three sub-pixels (RGB) is taken as an example for illustration in the present disclosure.

Figure 2:
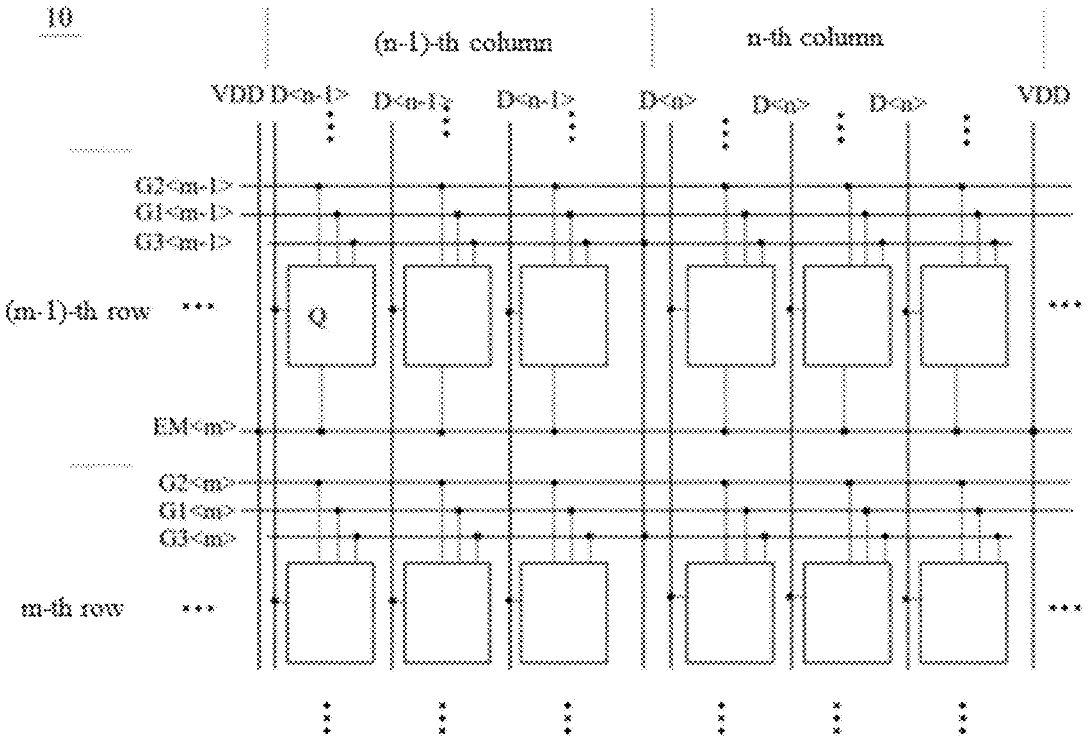
FIG. 2 is a partial schematic view showing a structure of a display substrate.

FIG. 2 is a schematic view showing a structure of a display substrate according to an embodiment of the present disclosure. As shown in FIG. 2, the display substrate 10 includes a plurality of pixel driving circuits Q arranged in an array form and light-emitting elements coupled to the pixel driving circuits Q respectively. The light-emitting element may be an OLED or a QLED. The light-emitting element is configured to emit light of a corresponding brightness in response to a signal outputted by a pixel driving circuit of a sub-pixel where the light-emitting element is located.

In an exemplary embodiment, the pixel driving circuits of the plurality of sub-pixels may be arranged in M*N, where M and N are each a positive integer greater than or equal to 1. For example, pixel driving circuits in a row arranged in a first direction are referred to as pixel driving circuits in a same row, and pixel driving circuits in a column arranged in a second direction are referred to as pixel driving circuits in a same column. In the present disclosure, the first direction is an extension direction of the sub-pixels in one row and the second direction is an extension direction of the sub-pixels in one column. Illustratively, the present disclosure gives an array arrangement of sub-pixels in adjacent rows and columns, i.e., an (m−1)-th row and an m-th row, an (n−1)-th column and an n-th column, where m is a positive integer greater than 1 and less than or equal to M, and n is a positive integer greater than 1 and less than or equal to N.

The pixel driving circuit Q includes a plurality of transistors and a storage capacitor. A transistor may be a Thin Film Transistor (TFT), a metal oxide semiconductor (MOS) or another switching element with the same characteristics, and the thin film transistor is taken as an example for illustration in the present disclosure. In an exemplary embodiment, the pixel driving circuit may include a structure of 2T1C, 3T1C, 4T1C, 5T1C, 5T2C, 6T1C, 7T1C, 7T2C, 8T1C, etc. where T represents a thin film transistor and C represents a storage capacitor.

In the pixel driving circuit of the embodiments of the present disclosure, each transistor may be, but not limited to, an N-type transistor. For example, one or more transistors in the pixel driving circuit may also be P-type transistors, and it is merely necessary to connect each electrode of the P-type transistor through referring to a connection of each electrode of a corresponding N-type transistor in the embodiment of the present disclosure, and apply a corresponding high level or low level to a corresponding gate electrode.

In an exemplary embodiment, the display substrate includes a plurality of signal lines and a plurality of scanning lines coupled to the plurality of pixel driving circuits. Illustratively, the plurality of signal lines includes one or more first signal lines D, a power source line VDD. For example, pixel driving circuits of sub-pixels in an n-th column (representing any one column) are coupled to the first signal line D (n) and the power source line VDD, the first signal line D (n) is configured to apply a data signal to the pixel driving circuits of sub-pixels in the n-th column, and the power source line VDD is configured to apply a power voltage signal to the pixel driving circuits.

In the exemplary embodiment, the plurality of scanning lines includes a first scanning line G1 and a second scanning line G2. For example, pixel driving circuits in a (m−1)-th row are coupled to the first scanning line G1<m−1>, the first scanning line G1<m−1> is configured to apply the first scanning signal to the pixel driving circuits in the (m−1)-th row, to control the data signal to be written into the pixel driving circuit. The pixel driving circuit is configured to receive the data signal transmitted from the first signal line D and output a corresponding current to the light-emitting element under the control of the first scanning line G1. The number of rows corresponding to each scanning line is represented in parentheses in FIG. 2, e.g., G1<m−1> represents the first scanning line of a (m−1)-th row, and G2<m−1> represents the second scanning line of the (m−1)-th row.

Figure 3:
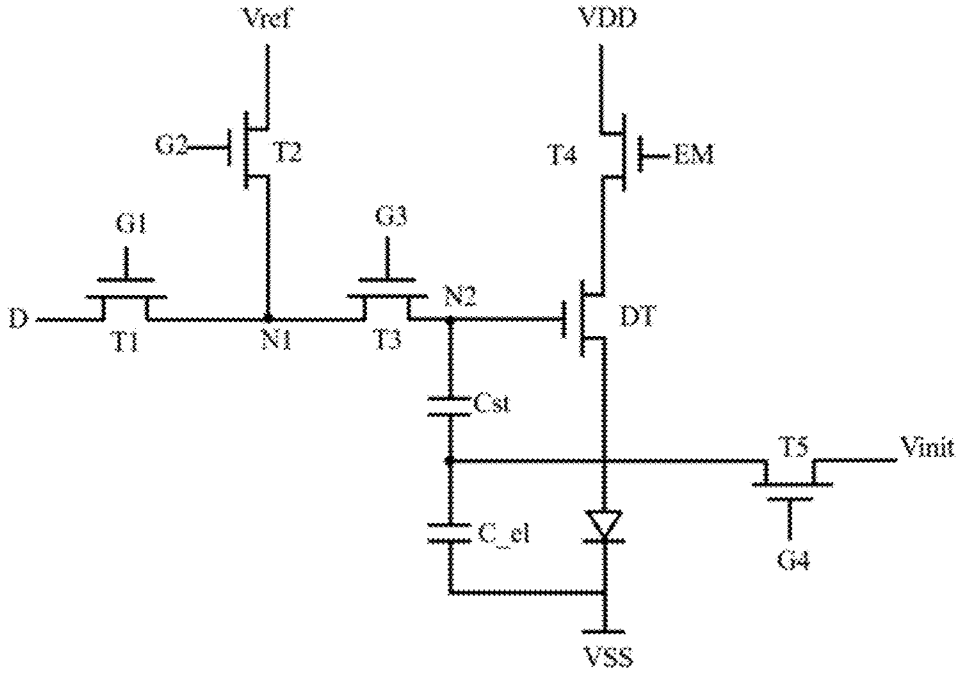
FIG. 3 is a partial schematic diagram of an equivalent circuit of a pixel driving circuit.

FIG. 3 is a schematic diagram of an equivalent circuit of a pixel driving circuit according to an embodiment of the present disclosure. As shown in FIG. 3, in an exemplary embodiment, the pixel driving circuit includes a storage capacitor and a plurality of transistors including a first transistor T1 and a second transistor T2.

In an exemplary embodiment, the display substrate 10 further includes a plurality of signal lines and a plurality of scanning lines coupled to the pixel driving circuit, the plurality of signal lines includes a first signal line D and a second signal line Vref. The plurality of scanning lines includes a first scanning line G1 and a second scanning line G2, both the first scanning line G1 and the second scanning line G2 extend in a first direction and are arranged sequentially in a second direction crossing the first direction, the first direction is an extension direction of sub-pixels in a row, and the second direction is an extension direction of sub-pixels in a column.

A gate electrode of the first transistor T1 is coupled to the first scanning line G1, a first electrode of the first transistor T1 is coupled to the first signal line D, and a second electrode of the first transistor T1 is coupled to the first node N1. When an on-level scanning signal is applied to the first scanning line G1, the first transistor T1 is configured to input a data voltage signal from the first signal line D to the first node N1 under control of a signal from the first scanning line G1.

A gate electrode of the second transistor T2 is coupled to the second scanning line G2, a first electrode of the second transistor T2 is coupled to the second signal line Vref, and a second electrode of the second transistor T2 is coupled to the first node N1. When an on-level scanning signal is applied to the second scanning line G2, the second transistor T2 is configured to input a reference voltage signal from the second signal line Vref to the first node N1 under the control of the second scanning line G2.

In the pixel driving circuit according to an embodiment of the present disclosure, the plurality of transistors further includes a third transistor T3, a fourth transistor T4, a fifth transistor T5 and a driving transistor DT. The plurality of scanning lines further includes a third scanning line G3, a light-emitting scanning line EM and a fourth scanning line G4. The plurality of signal lines further includes a power source line VDD and a third signal line Vinit.

A gate electrode of the third transistor T3 is coupled to the third scanning line G3, a first electrode of the third transistor T3 is coupled to the first node N1, and a second electrode of the third transistor T3 is coupled to a second node N2. When an on-level scanning signal is applied to the third scanning line G3, the third transistor T3 is configured to input the voltage of the first node N1 to the second node N2 under the control of the third scanning line G3.

A gate electrode of the fourth transistor T4 is coupled to the light-emitting scanning line EM, a first electrode of the fourth transistor T4 is coupled to the power source line VDD, and a second electrode of the fourth transistor T4 is coupled to a first electrode of the driving transistor DT. When an on-level signal is applied to the light-emitting scanning line EM, the fourth transistor T4 is configured to input a voltage signal from the power source line to the first electrode of the driving transistor DT under the control of the light-emitting scanning line EM.

A gate electrode of the driving transistor DT is coupled to the second node N2, i.e., coupled to the second electrode of the third transistor T3, the first electrode of the driving transistor DT is coupled to the second electrode of the fourth transistor T4, and a second electrode of the driving transistor DT is coupled to a first electrode of the light-emitting element. The driving transistor DT determines a driving current value according to a potential difference between a gate electrode and a first electrode thereof, and applies the generated driving current to the light-emitting element, to drive the light-emitting element to emit light.

A gate electrode of the fifth transistor T5 is coupled to the fourth scanning line G4, a first electrode of the fifth transistor T5 is coupled to the first electrode of the light-emitting element, and a second electrode of the fifth transistor T5 is coupled to the third signal line Vinit. When an on-level signal is applied to the fourth scanning line G4, the fifth transistor T5 is configured to transmit a voltage signal from the third signal line Vinit to the first electrode of the light-emitting element, so as to reset the first electrode of the light-emitting element.

The storage capacitor C has a first electrode plate C1 and a second electrode plate C2, the first electrode plate is coupled to the second node N2, namely, the first electrode plate C1 of the storage capacitor C is connected to the gate electrode of the driving transistor T3, and the second electrode plate C2 is coupled to the first electrode of the light-emitting element.

In an exemplary embodiment, the transistors in the pixel driving circuit may be low-temperature polysilicon thin film transistors, or oxide thin film transistors, or low-temperature polysilicon thin film transistors and oxide thin film transistors. An active layer of the low-temperature polysilicon thin film transistor is made of low-temperature polysilicon (LTPS), and an active layer of the oxide thin film transistor is made of oxide semiconductor. The low-temperature polysilicon thin film transistor has such advantages as high mobility and fast charging, and the oxide thin film transistor has such advantages as low leakage current. The low-temperature polysilicon thin film transistor and the oxide thin film transistor are integrated on one display substrate to form a display substrate containing both the low-temperature polysilicon thin film transistor and the oxide transistor (Low Temperature Poly-Silicon+Oxide, referred to as LTPO), thereby, through the advantages of the two, to realize the low-frequency driving, reduce the power consumption, and improve the display quality.

Figure 4:
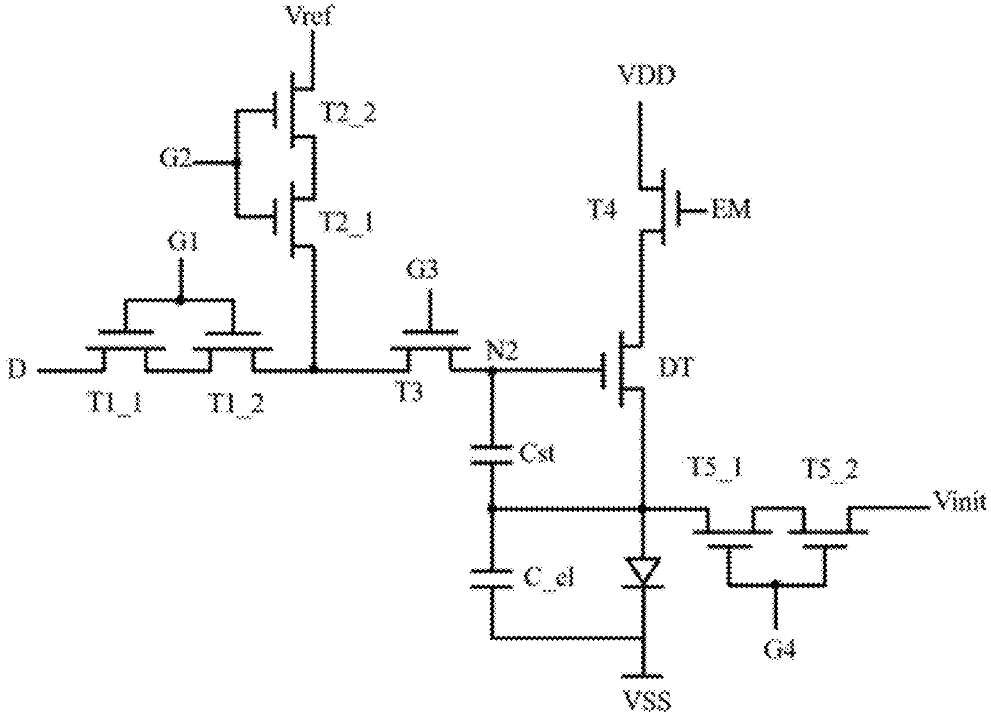
FIG. 4 is a partial schematic diagram of an equivalent circuit of a pixel driving circuit.

In an exemplary embodiment, a gate electrode of at least one thin film transistor is of a double-gate electrode structure, so as to avoid current leakage of the transistor in a better manner. As shown in FIG. 4, an equivalent circuit diagram is exemplarily given when the gate electrodes of the first transistor T1, the second transistor T2, and the fifth transistor T5 are each of a double-gate electrode structure. Although a portion of the thin film transistors in FIG. 4 is of a double-gate electrode structure, the present disclosure is not limited thereto. The thin film transistor of the present disclosure may also adopt a single-gate electrode structure, and a person skilled in the art may make a selection according to actual needs.

Figure 5:
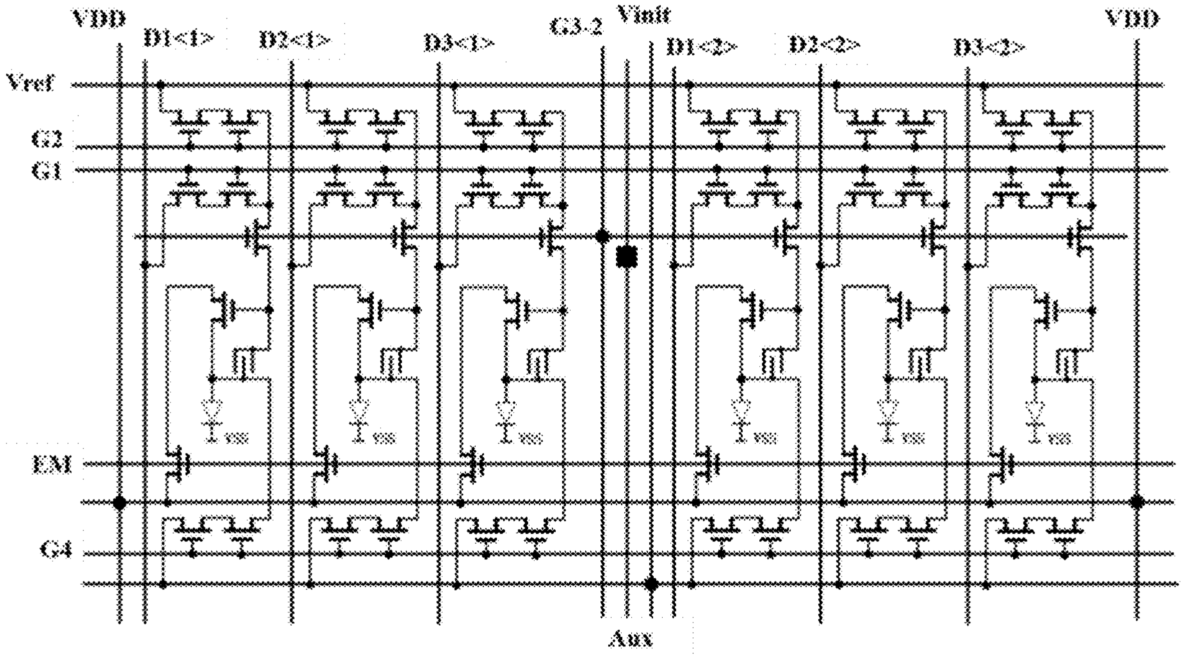
FIG. 5 is a partial schematic diagram of a circuit structure of a repeat unit according to an embodiment of the present disclosure.

FIG. 5 is a schematic diagram of a circuit configuration of a repeat unit according to an embodiment of the present disclosure. In a display substrate structure of the present disclosure, in order to improve the resolution and simplify the process, the scanning line or the signal line in the pixel driving circuit may be shared between different rows or different columns, and by way of example, sub-pixels in at least two rows or two columns share at least one of the scanning lines. Illustratively, at least two sub-pixels in a same row share at least one of the first scanning line G1, the second scanning line G2, the third scanning line G3 and the light-emitting scanning line EM.

As shown in FIG. 5, the present disclosure exemplarily gives a case where the sub-pixels in the same row shares the first scanning line G1, the second scanning line G2 and the light-emitting scanning line EM. In addition to sharing a scanning line, a signal line may also be shared between pixel driving circuits, for example, at least two sub-pixels in the same column are connected to the same first signal line. When sharing the lines in the display panel, it is able to improve the resolution of the display panel and reduce the difficulty in process. Although a case where the signal line and the scanning line are shared in a driving circuit is shown in FIG. 5, the present disclosure is not limited thereto, and a person skilled in the art may make a selection according to actual needs.

In an exemplary embodiment, both the power source line VDD and the third signal line Vinit may be designed as of a grid-like shape. The power source line VDD includes a first power source line VDD-1 extending in the first direction and a second power source line VDD-2 extending in the second direction, the first power source line VDD-1 is coupled to the second power source line VDD-2, and the first power source line VDD-1 is located on a side of the light-emitting scanning line EM away from the first scanning line G1. The fourth scanning line G4 extends in the first direction and is located on a side of the first power source line VDD-1 away from the light-emitting scanning line EM. The third signal line Vinit includes a first sub-line Vinit-1 extending in the first direction and a second sub-line Vinit-2 extending in the second direction, and the first sub-line Vinit-1 is located at a side of the fourth scanning line G4 away from the first scanning line G1. Through a grid-like arrangement structure, it is able to significantly reduce the voltage drop of signal transmission and improve image uniformity.

In an exemplary embodiment, in the second direction, a first branch scanning line G3-1 is located on a side of the first scanning line G1 away from the second scanning line G2, and the light-emitting scanning line EM is located on a side of the first branch scanning line G3-1 away from the first scanning line G1.

Figure 6:
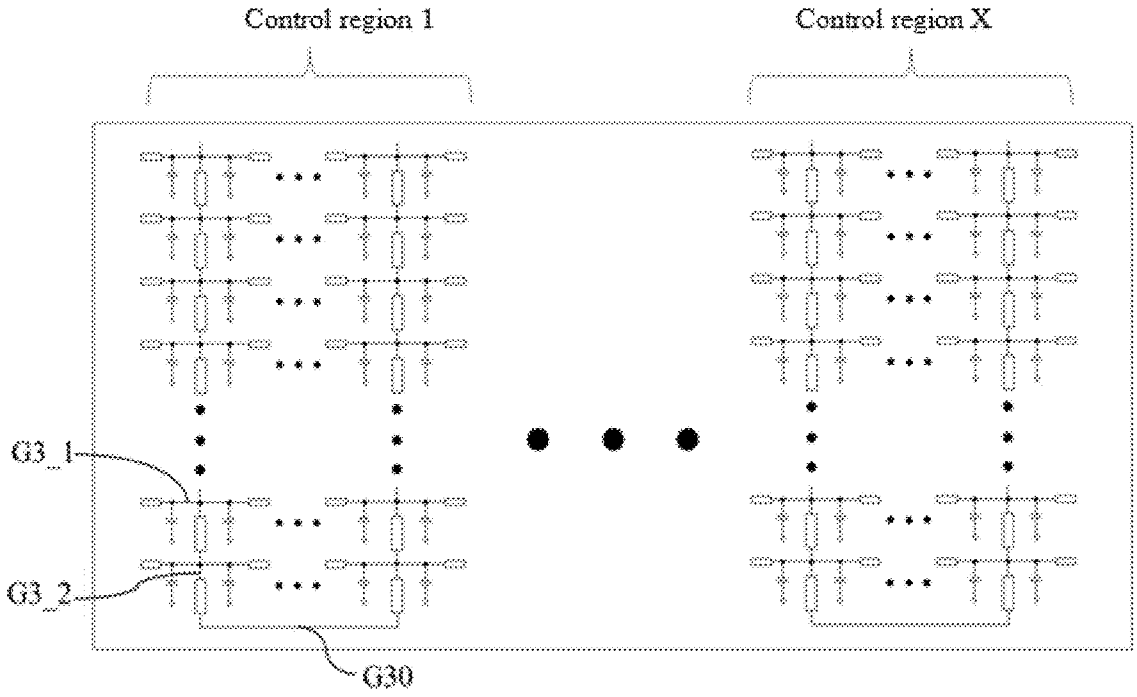
FIG. 6 is a partial schematic diagram of a resistance-capacitance equivalent of scanning lines arranged in a region-division manner according to an embodiment of the present disclosure.

In an exemplary embodiment, as shown in FIGS. 5 and 6, in order to more clearly describe an operation process of the pixel driving circuit, the display substrate is divided into a plurality of control regions (such as control region 1 to control region X) and a plurality of third scanning lines G3, and the plurality of control regions corresponds to the plurality of third scanning lines G3 respectively. Each control region includes at least one repeat unit, each repeat unit includes two sub-units arranged in the first direction, and each sub-unit includes a plurality of sub-pixels arranged in the first direction. The third scanning line G3 is coupled to the gate electrodes of the third transistors T3 included in each repeat unit in the corresponding control region, and configured to control the turn-on or turn-off of the third transistors T3 in each repeat unit in the corresponding control region.

According to the above-mentioned specific structure of the display substrate, it is derived that the display substrate in the embodiments of the present disclosure includes a plurality of control regions, and each third scanning line G3 can control whether all third transistors T3 in the corresponding control region are turned on, so as to control whether to realize a high refresh rate in the region.

In an exemplary embodiment, the third scanning lines G3 in a same control region are coupled to a control bus G30 to form an integral structure.

In an exemplary embodiment, the display substrate further includes a driving chip, the control bus G30 is located on a same side of the display substrate as the driving chip, the control bus is coupled to the driving chip, receives a control signal applied by the driving chip, and transmits the received control signal to the third scanning line G3 coupled thereto, thereby controlling whether the third transistors T3 in the corresponding control region are turned on.

In an exemplary embodiment, first branch scanning lines G3-1 are arranged in the second direction, and extend in the first direction. Second branch scanning lines G3-2 are arranged in the first direction and extend in the second direction. The second branch scanning line G3-2 is coupled to a plurality of first branch scanning lines G3-1. The second branch scanning lines G3-2 are coupled to the control bus G30. The first branch scanning line G3-1 is coupled to a gate electrode of each written-in control transistor T3 in a corresponding repeat unit.

Figure 7:
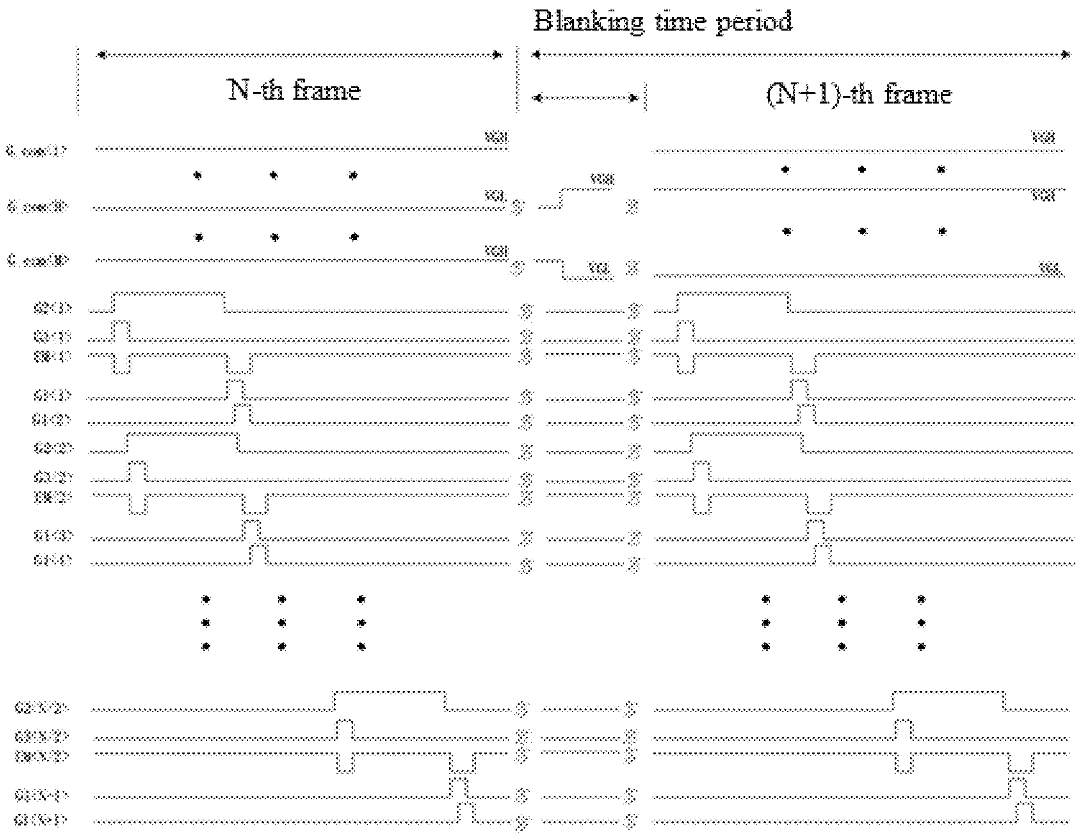
FIG. 7 is a driving timing sequence diagram according to an embodiment of the present disclosure.

In an exemplary embodiment, as shown in FIGS. 6 and 7, a detailed description will be given by taking a case where the display substrate includes X control regions as an example.

In a displaying time period of an Nth frame, control signals transmitted by a first one G3<1> of third scanning lines and a H-th one G3<H> of third scanning lines are each an active level VGH, all third transistors T3 included in a first control region corresponding to the first one G3<1> of the third scanning lines are turned on, and all third transistors T3 included in a H-th control region corresponding to the H-th one G3<H> of the third scanning lines are turned on, so it is able to ensure that the first control region and the H-th control region are each a region capable of realizing normal refresh, thereby to realize a high refresh operation for the first control region and the H-th control region when scanning the display substrate row by row. A control signal transmitted by an I-th third scanning line G3<I> is an inactive level VGL, all third transistors T3 included in an I-th control region corresponding to a corresponding I-th one G3<I> of the third scanning lines are turned off. When scanning the display substrate row by row, a high refresh operation is not realized in the I-th control region, so that the I-th control region is not refreshed within an N-th frame, and a display image thereof is not updated within the N-th frame, thereby to achieve the effect of high refresh operations performed in a region-division manner through applying saved data amount to high refresh regions. H and I are each a positive integer greater than 1 and less than or equal to X.

In a blanking time period, region division is performed for a (N+1)-th frame by controlling the control signal transmitted from the third scanning line G3. The blanking time period is located at the beginning or the end of each frame displaying time period.

In a displaying time period of a (N+1)-th frame, the control signals transmitted by the first one G3<1> of the third scanning line and the I-th one G3<I> of the third scanning lines are each an active level VGH, all the written-in control transistors T3 included in the first control region corresponding to the first one G3<1> of the third scanning lines are turned on, and all the written-in control transistors T3 included in the I-th control region corresponding to the I-th one G3<I> of the third scanning lines are turned on. In this way, it is able to ensure that the first control region and the I-th control region are each a region capable of realizing normal refresh, thereby to realize a high refresh operation for the first control region and the I-th control region when scanning the display substrate row by row. The control signal transmitted by the H-th one G3<H> of the third scanning lines is an inactive level VGL, all the written-in control transistors T3 included in the H-th control region corresponding to the H-th one G3<H> of the third scanning lines are turned off. When scanning the display substrate row by row, realize a high refresh operation is not realized in the H-th control region, so that the H-th control region is not refreshed within an H-th frame, and a display image thereof is not updated within the H-th frame, thereby to achieve the effect of high refresh operations performed in a region-division manner through applying saved data amount to high refresh regions.

In an exemplary embodiment, considering that the load of the third scanning line G3 is relatively large, the control signal transmitted by the third scanning line G3 may be adjusted immediately in response to entering the blanking time period at the end of the N-th frame.

In the display substrate of the embodiments of the present disclosure, by arranging the control region and the third scanning line G3, the display substrate can well realize the high refresh rate function of the display substrate.

In the display substrate of the above-mentioned embodiments, through the first branch scanning lines G3-1 and the second branch scanning lines G3-2, it is able to not only achieve the transmission of the control signal in a better manner, but also reduce the difficulty in the layout of the third scanning line, and ensure the reliability that the third scanning line is coupled to the gate electrode of the third transistor T3.

In an exemplary embodiment, in the same control region, the first branch scanning lines in the same row along the first direction are connected to each other in an end-to-end manner. Illustratively, in the same control region, the first branch scanning lines in the same row in the first direction are formed as an integral structure.

In an exemplary embodiment, adjacent first branch scanning lines in the first direction in adjacent control regions respectively are disconnected from each other.

In the display substrate of the above-mentioned embodiments, when the adjacent first branch scanning lines in the first direction in the same control region are coupled to each other, so that in the same control region, the third scanning lines form a grid-like structure, so as to reduce the overall load of the third scanning line G3 and reduce the voltage drop of the third scanning line G3.

In an exemplary embodiment, in the same control region, the adjacent first branch scanning lines in the first direction may also be arranged independently of each other.

In an exemplary embodiment, the power source line VDD includes a first power source line VDD-1 extending in the first direction and a second power source line VDD-2 extending in the second direction, the first power source line VDD-1 is coupled to the second power source line VDD-2. In the first direction, the second power source line VDD-2 is arranged alternately with the repeat unit, and an orthographic projection of the first branch scanning line G3-1 onto the base substrate does not overlap an orthographic projection of the second power source line VDD-2 onto the base substrate.

In an exemplary embodiment, as shown in FIGS. 8-26, in a direction perpendicular to the display substrate, the display substrate includes a base substrate 101, and an active layer 103, a first conductive layer 105, a second conductive layer 107, a third conductive layer 109 and a fourth conductive layer 112 that are arranged sequentially away from the base substrate. The base substrate 101 may be a flexible base substrate or a rigid base substrate.

Figure 8:
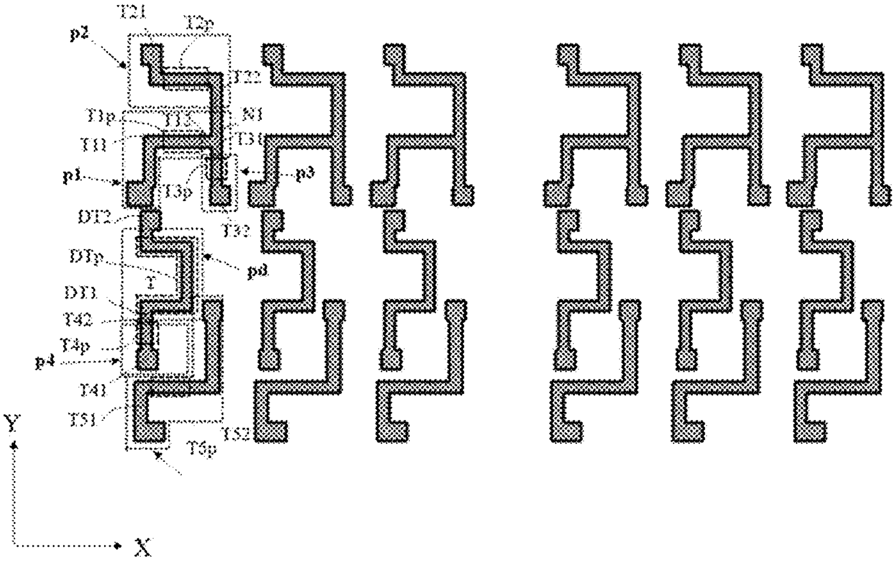
FIG. 8 is a partial schematic view showing patterns of an active layer according to an embodiment of the present disclosure.

FIGS. 8-25 schematically show planar views of various layers of the display substrate in the present disclosure. As shown in FIG. 8, there is an active layer 103 including an active pattern p of each transistor in the pixel driving circuit, the active pattern of each transistor including a channel region and one or more conductive regions. The conductive regions of each transistor are located on two sides of the channel region and serve as first and second electrodes of the transistor, respectively. Specifically, an active pattern p1 of the first transistor T1 includes a first channel region T1$p$, a first electrode T11 and a second electrode T12, an active pattern p2 of the second transistor T2 includes a second channel region T2$p$, a first electrode T21 and a second electrode T22, an active pattern p3 of the third transistor T3 includes a third channel region T3$p$, a first electrode T31 and a second electrode T32, an active pattern p4 of the fourth transistor T4 includes a fourth channel region T4$p$, a first electrode T41 and a second electrode T42, and an active pattern p5 of the fifth transistor T5 includes a fifth channel region T5$p$, a first electrode T51 and a second electrode T52, and an active pattern pd of the driving transistor DT includes a channel region DTp, a first electrode DT1 and a second electrode DT2. The second electrode T12 of the first transistor T1, the second electrode T22 of the second transistor and the first electrode T31 of the third transistor T3 are shared, and a position where the above three are commonly connected serves as the first node N1. A position where the second electrode T32 of the third transistor T3 is connected to the driving transistor serves as the second node N2. The first electrode DT1 of the driving transistor DT is reused as the second electrode T42 of the fourth transistor. The second electrode DT2 of the driving transistor DT is reused as the first electrode T51 of the fifth transistor. Other electrodes such as the first electrode T11 of the first transistor, the first electrode T21 of the second transistor, the first electrode T41 of the fourth transistor and the first electrode T22 of the fifth transistor are separately arranged.

Please continue to refer to FIG. 8, wherein the active pattern p1 of the first transistor T1, the active pattern p2 of the second transistor T2 and the active pattern p3 of the third transistor T3 of a pixel in an m-th row are an integral structure, and are located on a side of the active pattern pd of the driving transistor of a pixel driving circuit in the m-th row close to a pixel driving circuit in a (m−1)-th row, and the active pattern p4 of the fourth transistor T4 and the active pattern p5 of the fifth transistor T5 are located on a side of the active pattern pd of the driving transistor of the pixel driving circuit in the m-th row close to the pixel driving circuit in the (m−1)-th row.

In an exemplary embodiment, the active layer may be formed by one or more of amorphous silicon, polysilicon, oxide semiconductor materials.

Figure 9:
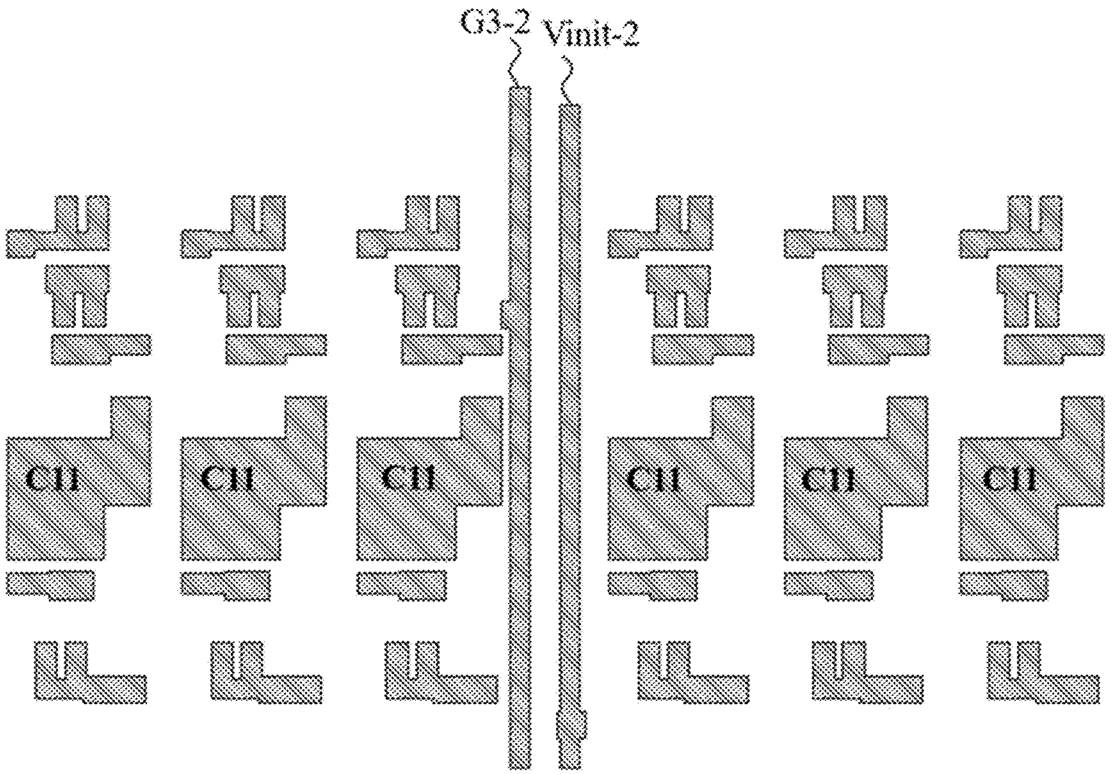
FIG. 9 is a partial schematic view showing patterns of a first conductive layer according to an embodiment of the present disclosure.

FIG. 9 shows a first conductive layer 105, which may be referred to as a first gate metal layer, includes the gate electrode of each transistor, the second branch scanning line G3-2 and a second sub-line vinit-2.

In an exemplary embodiment, the first electrode plate of the storage capacitor includes a first electrode sub-plate C1 and a second electrode sub-plate C12, and the first electrode sub-plate is located at the first conductive layer.

Figure 10:
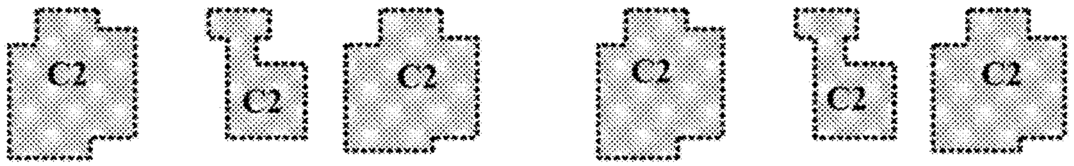
FIG. 10 is a partial schematic view showing patterns of a second conductive layer according to an embodiment of the present disclosure.

FIG. 10 shows a second conductive layer 107, which may be referred to as a second gate metal layer. In an exemplary embodiment, the second electrode plate C2 of the storage capacitor is located in the second conductive layer.

Figure 11:
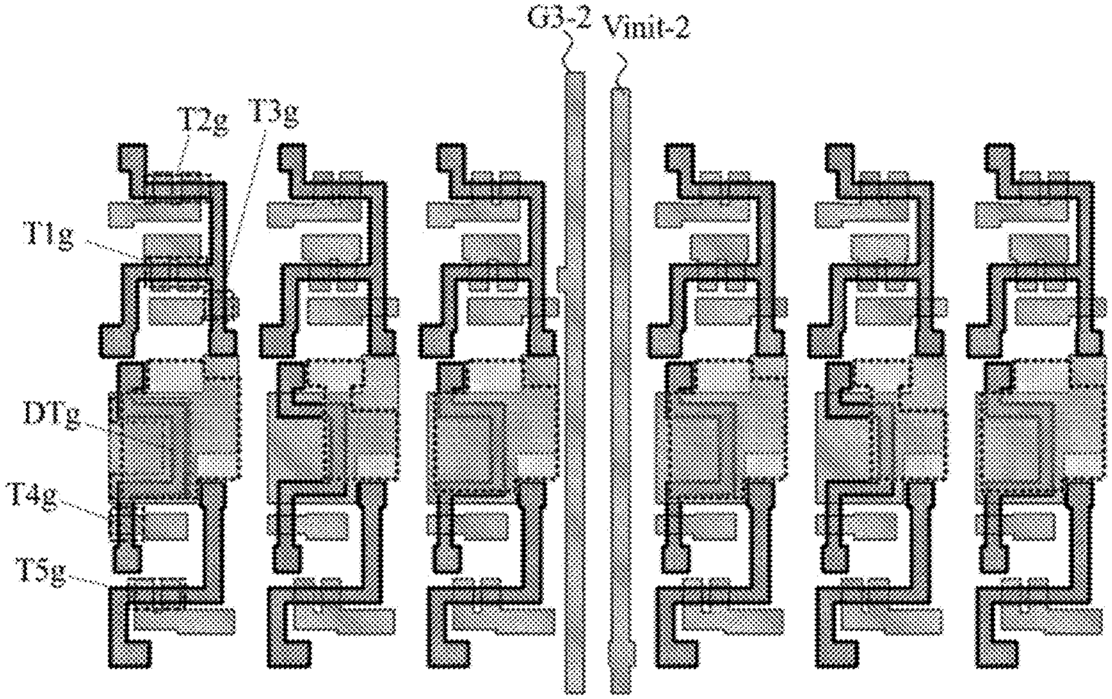
FIG. 11 is a partial schematic view showing a structure where the patterns of the active layer, the patterns of the first conductive layer and the patterns of the second conductive layer are laminated one on another according to an embodiment of the present disclosure.

FIG. 11 is a schematic view showing a structure where the active layer 103, the first conductive layer 105 and the second conductive layer 107 are laminated one on another, an orthographic projection of the first conductive layer 105 onto the base substrate 101 overlaps an orthographic projection of the active layer 103 onto the base substrate 101 at a region which serves as the gate electrode of each transistor, specifically including a gate electrode T1$g$ of the first transistor, a gate electrode T2$g$ of the second transistor, a gate electrode T3$g$ of the third transistor, a gate electrode T4g of the fourth transistor, a gate electrode T5g of the fifth transistor and a gate electrode DTg of the driving transistor DT.

Figure 26:
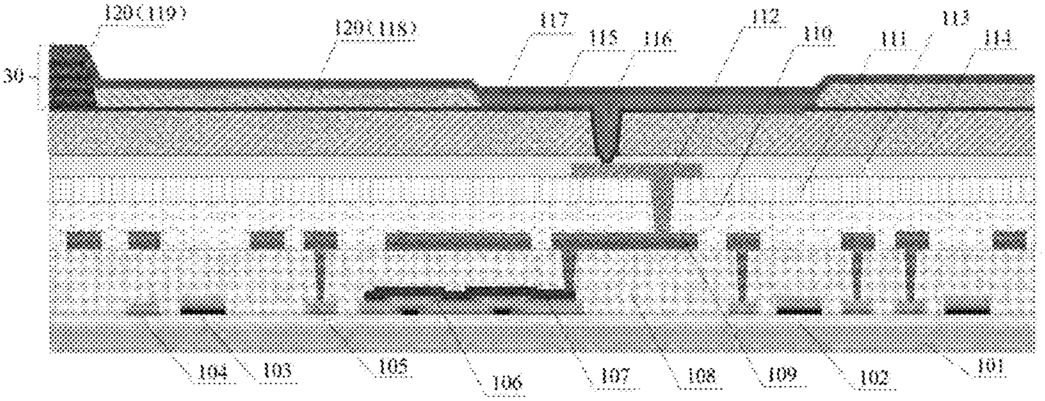
FIG. 26 is a sectional view of the structure in FIG. 25 along line A-A' according to an embodiment of the present disclosure.

In an exemplary embodiment, referring to FIGS. 11 and 26, a process for forming the display substrate may include: forming a buffer layer 102 on the base substrate 101, forming a semiconductor material on a side of the buffer layer 102 away from the base substrate 101 through a deposition process to form the active layer 103, and patterning the active layer 103 to form the active pattern p of each transistor; forming a gate insulation layer 104 on the active layer 103 through a deposition process, then forming the first conductive layer 105 on the gate insulation layer 104 through a deposition process, and patterning the first conductive layer 105 to form the second branch scanning line G3-2, the second sub-line vinit-2, a first electrode sub-plate C11 of the storage capacitor C and the gate electrode of each transistor; performing conducting processing on a part of the active layer 103, so that a channel region of each transistor of the pixel driving circuit is formed in a region shielded by the first conductive layer 105, and another part of the active layer 103 which is not shielded is conducted, namely, the conductive regions of the active pattern of each transistor are formed; forming a first insulation layer 106 on the first conductive layer 105 through a deposition process, forming a second conductive layer 107 on the first insulation layer 106 through a deposition process, and patterning the second conductive layer 107 to form the second electrode plate C2 of the storage capacitor.

Figure 12:
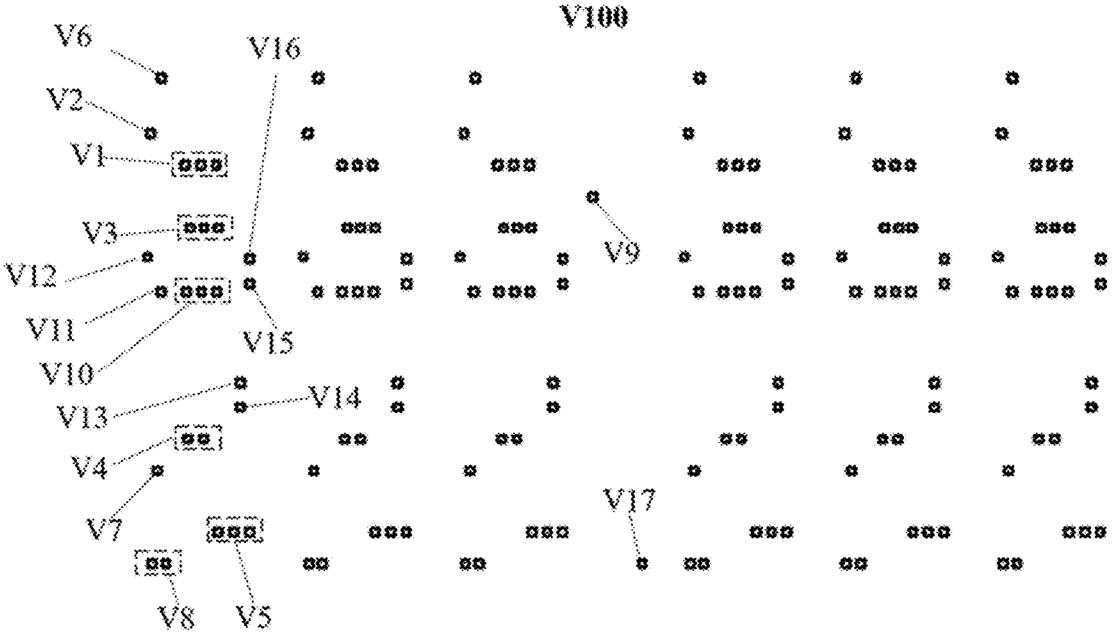
FIG. 12 is a partial schematic view showing a via-hole structure penetrating an interlayer insulation layer according to an embodiment of the present disclosure.

As shown in FIG. 12, on a side of the second conductive layer 107 (Gate2) away from the base substrate, namely, between the second conductive layer and the third conductive layer, an interlayer insulation layer 108 is provided, a first via-hole structure V100 penetrating the interlayer insulation layer 108 is formed in the interlayer insulation layer 108, and through the first via-hole structure V100, structures above and below the interlayer insulation layer 108 are connected to each other. The first via-hole structure V100 includes a plurality of via-holes.

Figure 13:
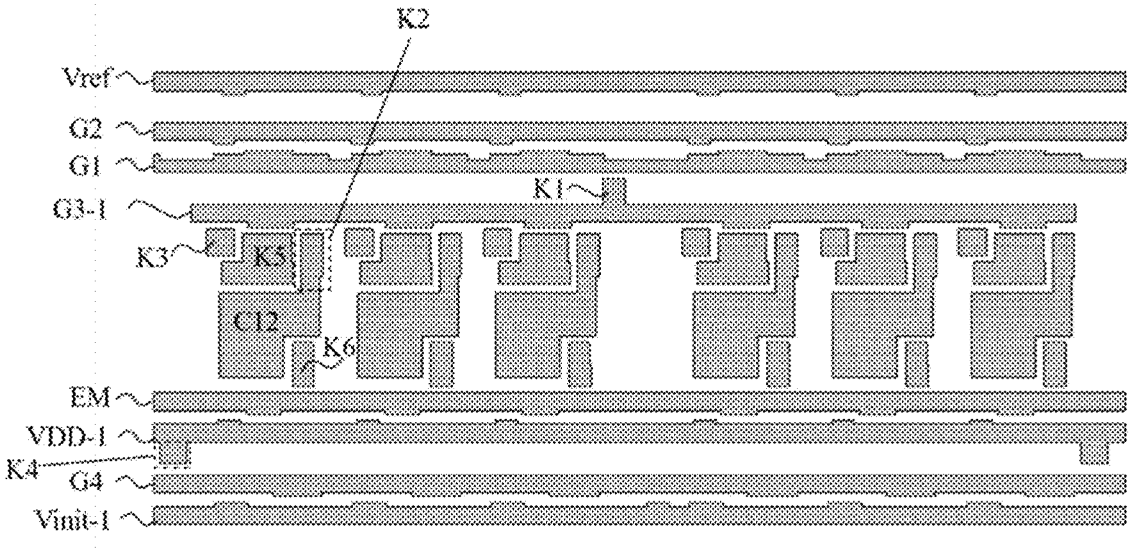
FIG. 13 is a partial schematic view showing patterns of a third conductive layer according to an embodiment of the present disclosure.

FIG. 13 shows the third conductive layer 109 (SD1) which includes the first scanning line G1, the second scanning line G2, the first branch scanning line G3-1, the light-emitting scanning line EM, the fourth scanning line G4, the second signal line Vref, the first power source line VDD-1, the first sub-line Vinit-1 and the second sub-electrode plate C12 of the storage capacitor. The first scanning line G1, the second scanning line G2, the first branch scanning line G3-1, the light-emitting scanning line EM, the fourth scanning line G4, the second signal line Vref, the first power source line VDD-1 and the first sub-line Vinit-1 all extend along the first direction and are arranged along the second direction. Illustratively, within sub-pixels in a (m−1)-th row, the first scanning line G1 and the second scanning line G2 are arranged adjacent to each other, the first scanning line G1 is located on one side of the second scanning line G2 close to sub-pixels in an m-th row, and the first branch scanning line G3-1 is located on one side of the first scanning line G1 away from the second scanning line G2. The first branch scanning line G3-1 includes a first connection member K1, and within the sub-pixels in the m-th row (any row), the first connection member K1 is located on one side of the first branch scanning line G3-1 close to the first scanning line G1. The second signal line Vref is arranged adjacent to the second scanning line G2 and on a side of the second scanning line G2 away from the first scanning line G1. The first power source line VDD-1 is arranged adjacent to the light-emitting scanning line EM, and located on a side of the light-emitting scanning line EM away from the first scanning line G1. The fourth scanning line G4 is located on a side of the first power source line VDD-1 away from the light-emitting scanning line EM. The first sub-line vinit-1 is located on a side of the fourth scanning line G4 away from the first scanning line G1. A spacing between the second signal line Vref and the second scanning line G2 is greater than or equal to a spacing between the first scanning line G1 and the second scanning line G2.

In an exemplary embodiment, the third conductive layer includes a second connection member K2, and the second connection member K2 and the second sub-electrode plate form an integral structure. The third conductive layer further includes a third connection member K3, which is located at a left side of the second connection member as viewed from the top of the display substrate within sub-pixels in a same row.

In an exemplary embodiment, the first power source line VDD-1 includes a fourth connection member K4 which is located on a side of the first power source line VDD-1 close to the fourth scanning line G4 within the sub-pixels in the same row.

In an exemplary embodiment, the third conductive layer includes a fifth connection member K5 and a sixth connection member K6, and within the sub-pixels in the same row, the second connection member K2, the third connection member K3, the fifth connection member K5 and the sixth connection member K6 are all located between the first branch scanning line G3-1 and the light-emitting scanning line EM.

In an exemplary embodiment of the present disclosure, respective connection members, including the first connection member K1, the second connection member K2, the third connection member K3, the fourth connection member K4, the fifth connection member K5, and the sixth connection member K6, are used for electrical connection of respective conductive layer structures.

Figure 14:
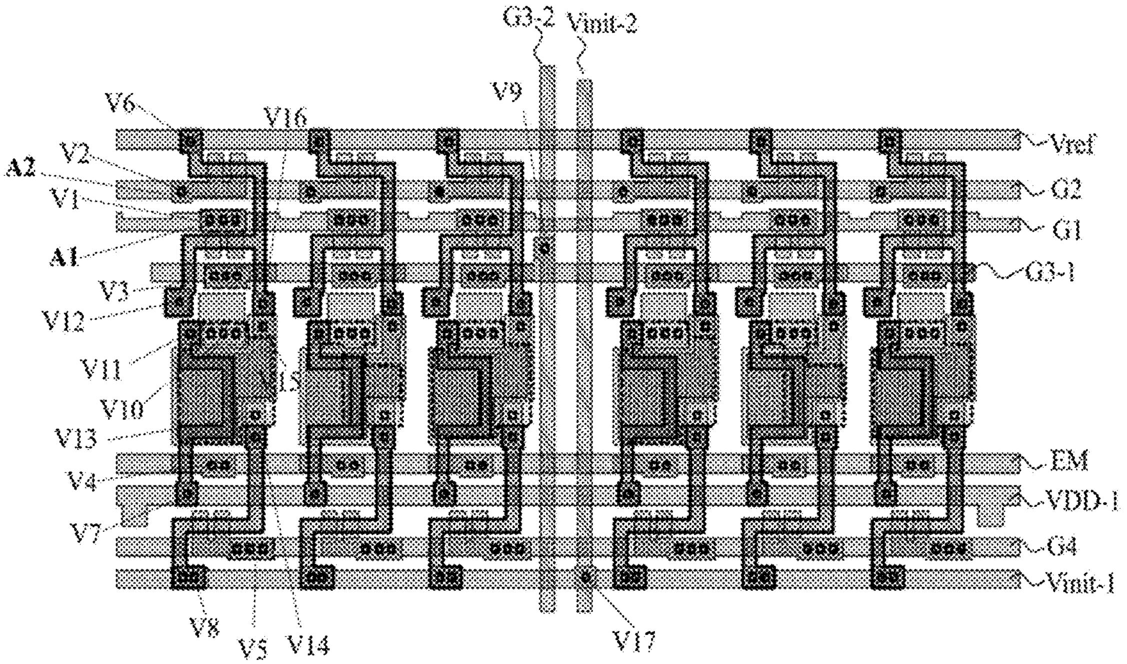
FIG. 14 is a partial schematic view showing a structure where the patterns of the active layer, the patterns of the first conductive layer, the patterns of the second conductive layer pattern and the patterns of the third conductive layer are laminated one on another according to an embodiment of the present disclosure.

FIG. 14 is a schematic view showing a structure where the patterns of the active layer 103, the patterns of the first conductive layer 105, the patterns of the second conductive layer 107 and the patterns of the third conductive layer 109 are laminated one on another. In specific, reference is made to FIGS. 8-14 and 26, the first scanning line G1 is coupled to the gate electrode T1g of the first transistor through the first via-hole structure, e.g., a first via-hole V1. The second scanning line G2 is coupled to the gate electrode T2g of the second transistor T2 through the first via-hole structure, e.g., a second via-hole V2. The first branch scanning line G3-1 is coupled to the gate electrode T3g of the third transistor through the first via-hole structure, e.g., a third via-hole V3. The light-emitting scanning line EM is coupled to the gate electrode T4g of the fourth transistor T4 through the first via-hole structure, e.g., a fourth via-hole V4. The fourth scanning line G4 is coupled to the gate electrode T5g of the fifth transistor through the first via-hole structure, e.g., a fifth via-hole V5. The second signal line Vref is coupled to the first electrode T21 of the second transistor through the first via-hole structure, e.g., a sixth via-hole V6. The first power source line VDD-1 is coupled to the first electrode T41 of the fourth transistor through the first via-hole structure, e.g., a seventh via-hole V7. The first sub-line Vinit-1 is coupled to the first electrode T51 of the fifth transistor through the first via-hole structure, e.g., an eighth via-hole V8.

Referring to FIGS. 8 and 14, within the sub-pixels in the same row, the first channel region T1p is located on the side of the first scanning line G1 away from the second scanning line G2, and the second channel region T2*p* is located on the side of the second scanning line G2 away from the first scanning line G1.

In an exemplary embodiment, an orthographic projection of the gate electrode T1*g* of the first transistor T1 onto the base substrate at least partially overlaps an orthographic projection of the first scanning line G1 onto the base substrate at a first overlapping region A1, and an orthographic projection of the first via-hole V1 onto the base substrate is located in the first overlap region A1. An orthographic projection of the gate electrode T2*g* of the second transistor onto the base substrate at least partially overlaps an orthographic projection of the second scanning line G2 onto the base substrate at a second overlapping region A2, and an orthographic projection of the second via-hole V2 onto the base substrate is located in the second overlap region A2. A distance between the first via-hole V1 and the second via-hole V2 is greater than a distance between the first scanning line G1 and the second scanning line G2. Within the sub-pixels in same row, the fifth channel region T5*p* is located on a side of the fourth scanning line G4 close to the second scanning line G2. The channel region of the driving transistor may be of a U-like type, including an opening structure T which, within sub-pixels in an n-th column, faces sub-pixels in a (n−1)-th column.

With continuing reference to FIGS. 8-14, the second branch scanning line G3-2 is coupled to the first branch scanning line G3-1 through the first via-hole structure, e.g., a ninth via-hole V9, and an orthographic projection of the ninth via-hole V9 onto the base substrate is within an orthographic projection of the first connection member K1 onto the base substrate.

In an exemplary embodiment, the third connection member K3 is coupled to the first electrode T11 of the first transistor T1 through the first via-hole structure, e.g., a twelfth via-hole V12. The fifth connection member K5 is coupled to the second electrode plate C2 of the storage capacitor through the first via-hole structure, e.g., a tenth via-hole V10, and coupled to the second electrode of the driving transistor through an eleventh via-hole V11. Illustratively, the tenth via-hole V10 and the eleventh via-hole V1 are arranged in the first direction and do not overlap each other in a direction perpendicular to the base substrate.

The sixth connection member K6 is coupled to the second electrode plate C2 of the storage capacitor through the first via-hole structure, e.g., a thirteenth via-hole V13, and coupled to the first electrode of the fifth transistor through the fourteenth via-hole V14. The second electrode sub-plate C12 is coupled to the first electrode sub-plate C11 of the storage capacitor and the second node N2 through the first via-hole structure, e.g., a fifteenth via-hole V15 and a sixteenth via-hole V16, respectively. Within the sub-pixels in the same column, the fifteenth via-hole V1 and the sixteenth via-hole V16 are arranged along the second direction, and the thirteenth via-hole V13 and the fourteenth via-hole V14 are arranged in the second direction. Illustratively, an orthographic projection of the sixth connection member K6 onto the base substrate covers orthographic projections of the thirteenth via-hole V13 and the fourteenth via-hole V14 onto the base substrate.

The first sub-line Vinit-1 is coupled to the second sub-line Vinit-2 through the first via-hole structure, e.g., a seventeenth via-hole V17.

In the display substrate of the embodiments of the present disclosure, it is able to improve electrical connection performance and reduce connection resistance through multiple via-holes. A person skilled in the art would have been able to select the quantity of via-holes used when connecting different conductive layers according to actual needs.

Figure 15:
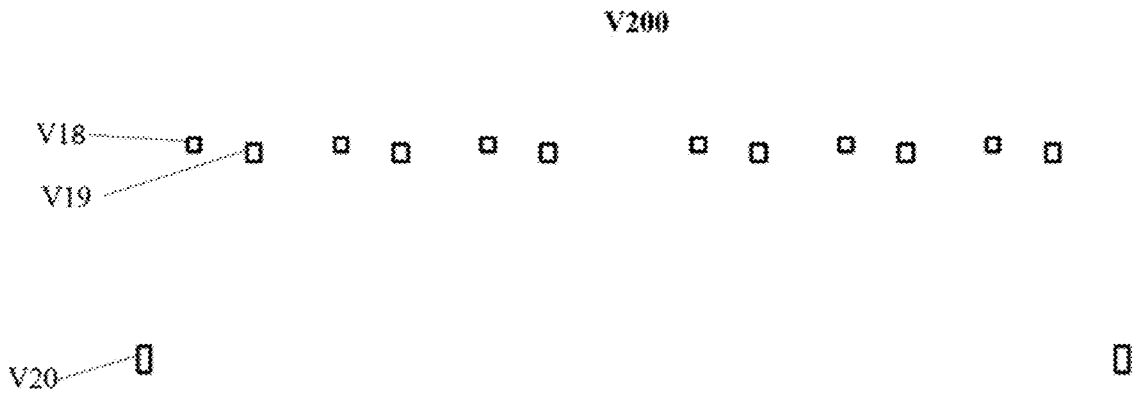
FIG. 15 is a partial schematic view showing a via-hole structure penetrating a first organic layer according to an embodiment of the present disclosure.

As shown in FIG. 15, a first organic layer 110 is provided on a side of the third conductive layer 109 away from the base substrate 101, and a second via-hole structure V200 is formed penetrating the first organic layer 110. Structures above and below the first organic layer 110 are connected to each other through the second via-hole structure V200, and the second via-hole structure V200 includes a plurality of via-holes.

Figure 16:
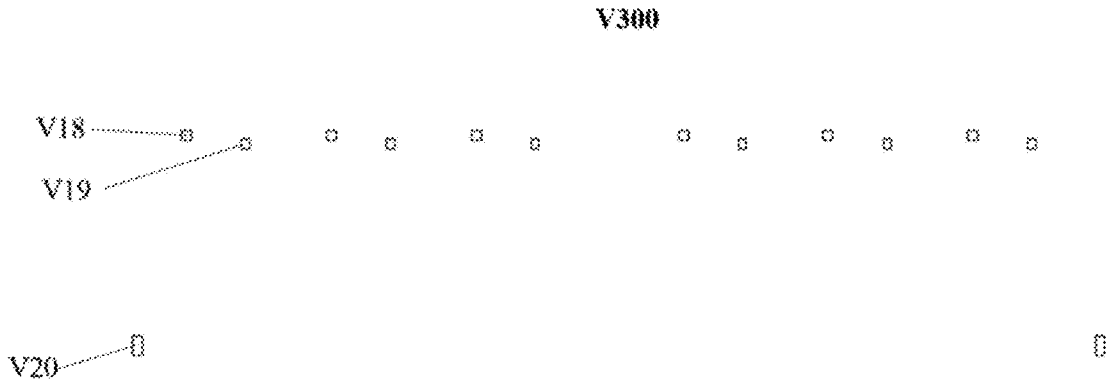
FIG. 16 is a partial schematic view showing a via-hole structure penetrating a first passivation layer according to an embodiment of the present disclosure.

In an exemplary embodiment, as shown in FIGS. 16 and 26, a first passivation layer 111 may further be provided on a side of the first organic layer 110 away from the base substrate 101, the first passivation layer 111 includes a third via-hole structure V300 penetrating the first passivation layer PVX1, and the third via-hole structure V300 is arranged corresponding to the second via-hole structure V200 for electrical connection between structures above the first organic layer 110 and below the first passivation layer 111.

Figure 17:
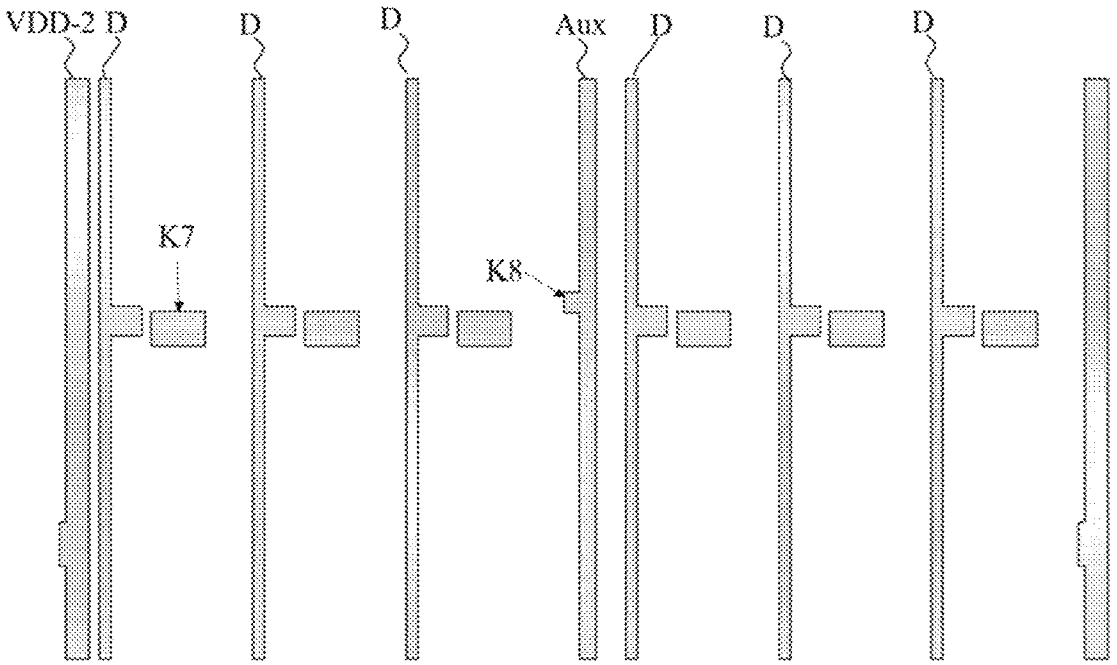
FIG. 17 is a partial schematic view showing patterns of a fourth conductive layer according to an embodiment of the present disclosure.

FIG. 17 shows the fourth conductive layer 112, which includes a plurality of first signal lines D extending in the second direction, the second power source line VDD-2 and a seventh connection member K7.

In an exemplary embodiment, the fourth conductive layer 11 further includes an auxiliary electrode Aux, the auxiliary electrode Aux includes an eighth connection member K8 located on a left side of the auxiliary electrode line Aux as viewed from the top. In the first direction, the auxiliary electrode Aux is disposed adjacent to the second branch scanning line G3-2 as viewed from the top.

Figure 18:
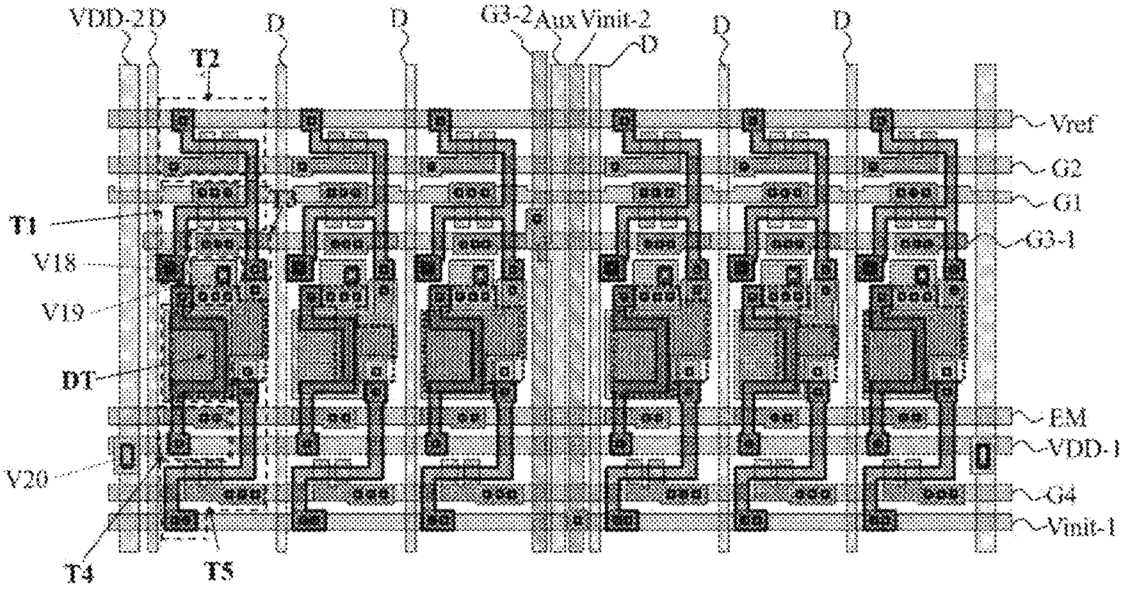
FIG. 18 is a partial schematic view showing a structure where the patterns of the active layer, the patterns of the first conductive layer, the patterns of the second conductive layer pattern, the patterns of the third conductive layer and the patterns of the fourth conductive layer are laminated one on another according to an embodiment of the present disclosure.

FIG. 18 is a schematic view showing a structure where the patterns of the active layer 103, the patterns of the first conductive layer 105, the patterns of the second conductive layer 107, the patterns of the third conductive layer 109 and the patterns of the fourth conductive layer 112 are laminated one on another. One first signal line D is shared by the sub-pixels in the same column, and the first signal line D is coupled to the third connection member K3 through the second via-hole structure, e.g., an eighteenth via-hole V18, so as to realize that the first signal line D is coupled to a first electrode of a corresponding first transistor T1. An orthographic projection of the third connection member onto the base substrate covers orthographic projections of the twelfth via-hole and the eighteenth via-hole onto the base substrate.

In an exemplary embodiment, an orthographic projection of the auxiliary electrode Aux onto the base substrate overlaps the orthographic projection of the first branch scanning line G3-1 onto the base substrate. The seventh connection member K7 is coupled to the seventh connection member K5 through the second via-hole structure, e.g., a nineteenth via-hole V19, so that the seventh connection member K7 is coupled to the second electrode plate C2 of the storage capacitor and the second electrode of the driving transistor. An orthographic projection of the seventh connection member K7 onto the base substrate covers an orthographic projection of the nineteenth via-hole V19 onto the base substrate. Illustratively, from a top view, within the sub-pixels in the same row, the nineteenth via-hole V19 is located on a side of the tenth via-hole V10 close to the first scanning line G1.

In an exemplary embodiment, an orthographic projection of the fifth connection member K5 onto the base substrate overlaps the orthographic projection of the seventh connection member K7 onto the base substrate. The fifth connection member covers orthographic projections of the tenth, eleventh, and nineteenth via-holes onto the base substrate.

In an exemplary embodiment, the second power source line VDD-2 is connected to the first power source line VDD-1 through the second via-hole structure, e.g., a twentieth via-hole V20. An orthographic projection of the twentieth via-hole V20 onto the base substrate partially overlaps an orthographic projection of the fourth connection member K4 onto the base substrate. Illustratively, a width of the twentieth via-hole V20 in the first direction is less than a width of the twentieth via-hole in the second direction.

In an exemplary embodiment, a second organic layer 114 is provided on a side of the fourth conductive layer 112 away from the base substrate, a fourth via-hole structure V400 is formed penetrating the second organic layer 114, and through the fourth via-hole structure V400, structures above and below the second organic layer 114 are connected to each other. The fourth via-hole structure V400 includes a plurality of via-holes.

Figure 19:
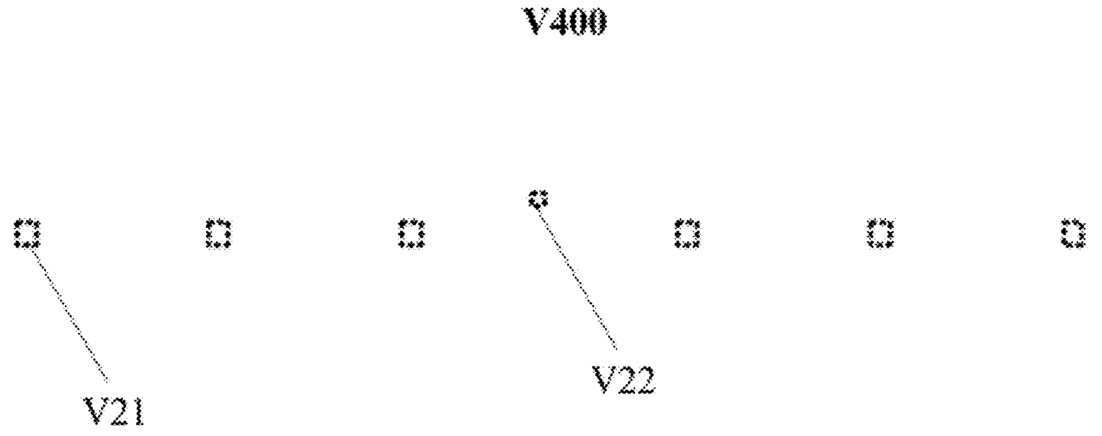
FIG. 19 is a partial schematic view showing a via-hole structure penetrating a second passivation layer according to an embodiment of the present disclosure.
Figure 20:
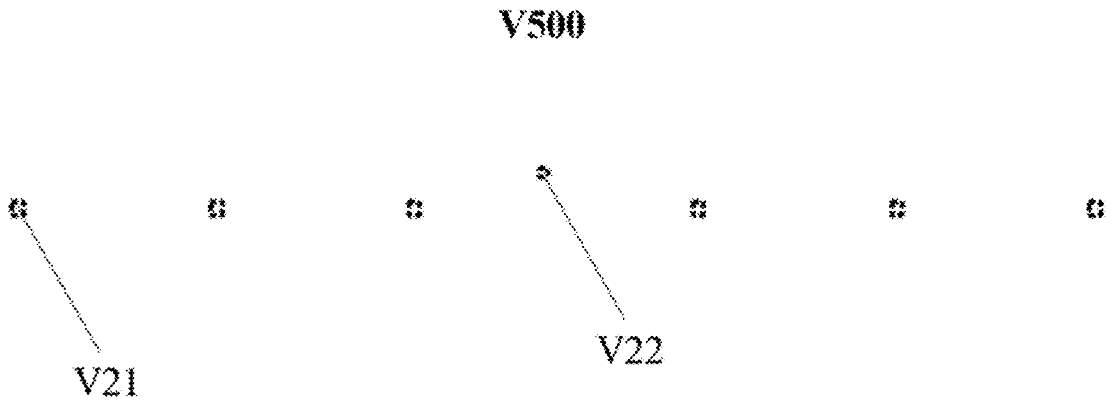
FIG. 20 is a partial schematic view showing a via-hole structure penetrating a second organic layer according to an embodiment of the present disclosure.
Figure 21:
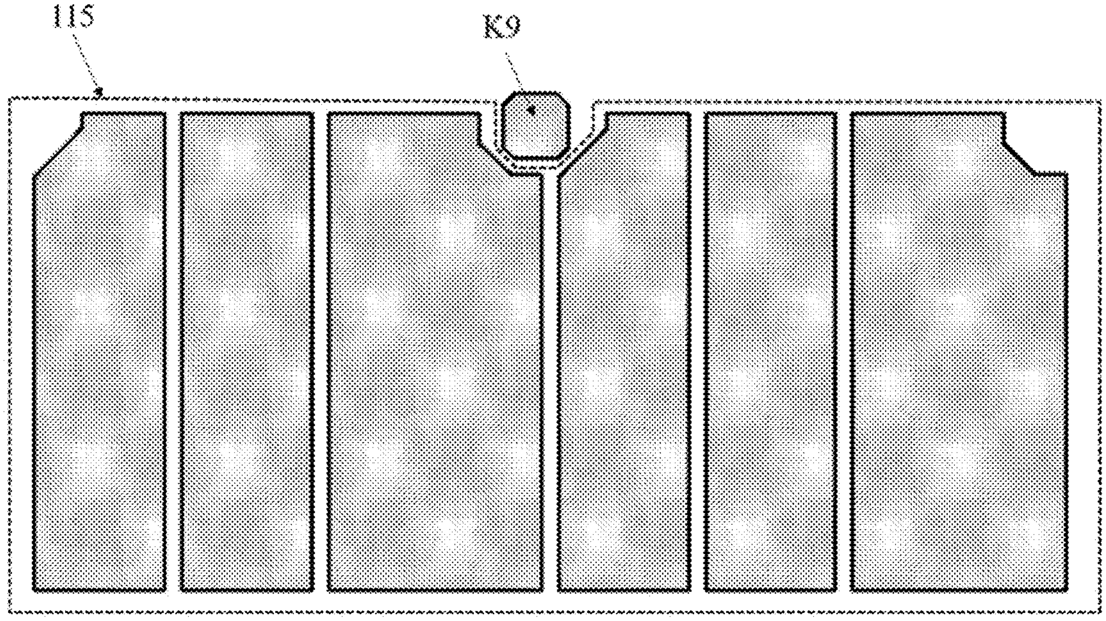
FIG. 21 is a partial schematic view showing patterns of a first electrode layer pattern according to an embodiment of the present disclosure.
Figure 22:
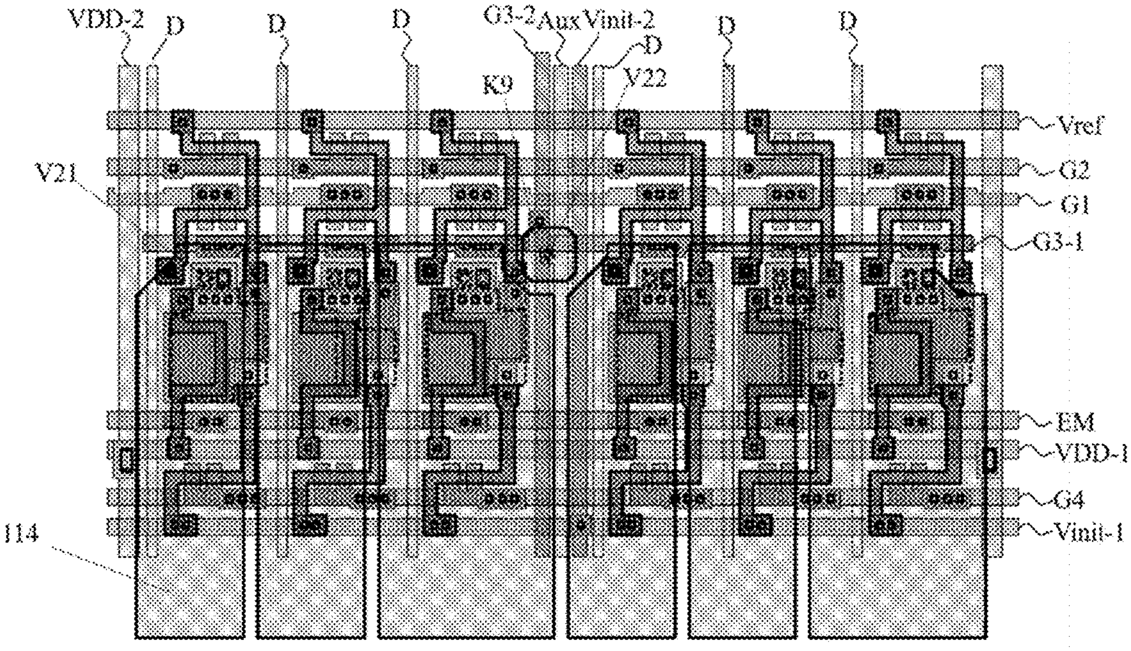
FIG. 22 is a partial schematic view showing a structure where the patterns of the active layer, the patterns of the first conductive layer, the patterns of the second conductive layer pattern, the patterns of the third conductive layer and the patterns of the fourth conductive layer, and the patterns of the first electrode layer are laminated one on another according to an embodiment of the present disclosure.

In an exemplary embodiment, a second passivation layer 113 may be further provided between the second organic layer 114 and the fourth conductive layer 112, and the second passivation layer 113 includes a fifth via-hole structure V500 including a plurality of via-holes. FIGS. 19 and 20 are schematic views showing via-hole structures corresponding to the second passivation layer 113 and the second organic layer 114, respectively, and the fifth via-hole structure V500 is provided corresponding to the fourth via-hole structure V400.

The display substrate in the embodiments of the present disclosure includes the first passivation layer and the second passivation layer, and in other embodiments, the display substrate may not include a passivation layer or include only one passivation layer. Illustratively, when the display substrate includes the first passivation layer 111, since there are the first organic layer and the first passivation layer between the third conductive layer 109 and the fourth conductive layer 112, the third conductive layer 109 is relatively far away from the fourth conductive layer 112, so it is able to effectively reduce the parasitic capacitance between a conductive line formed by the fourth conductive layer 112 and a conductive line formed by the third conductive layer 109, thereby satisfying the load requirements of medium-sized and large-sized display products and providing support for a high refresh rate. Same principle applies to the arrangement of the second passivation layer 113 and the second organic layer 114.

As shown in FIGS. 21 to 26, the display substrate includes a light-emitting element layer 30, the light-emitting element layer 30 is located on a side of a second organic layer 114 away from the base substrate 101, and includes a first electrode layer 115, a pixel definition layer 120, a light-emitting functional layer 116 and a second electrode layer 117 laminated one on another. The first electrode layer includes a plurality of first electrodes corresponding to the plurality of sub-pixels respectively, and the plurality of first electrodes is coupled to a lower conductive layer through via-hole structures penetrating the second organic layer 114 and the second passivation layer 113. Illustratively, the plurality of first electrodes is coupled to the seventh connection member 7 located in the fourth conductive layer 112 through a twenty-first via-hole V21, so that the plurality of first electrodes is coupled to the second electrode plate C2 of the storage capacitor and the second electrode of the driving transistor. The first electrode layer 115 further includes a ninth connection member K9 coupled to the auxiliary electrode Aux through the fourth via-hole structure, e.g., a twenty-second via-hole V22. An orthographic projection of the ninth connection member K9 onto the base substrate covers an orthographic projection of the eighth connection member K8 onto the base substrate. By way of example, the orthographic projection of the eighth connection member K8 onto the base substrate may be in the middle of the orthographic projection of the ninth connection member K9 onto the base substrate. The light-emitting functional layer 116 is connected to the first electrode 115, the second electrode 117 is connected to the light-emitting functional layer 115, and the light-emitting functional layer 116 emits light in a corresponding color driven by the first electrode 115 and the second electrode 117.

In the exemplary embodiment, the nineteenth via-hole V19 and the twenty-first via-hole V21 are arranged along the first direction within the sub-pixels in same row.

In an exemplary embodiment, the light-emitting functional layer 116 may include a hole injection layer (HIL), a hole transport layer (HTL), an electron blocking layer (EBL), an emitting layer (EML), a hole blocking layer (HBL), an electron transport layer (ETL) and an electron injection layer (EIL) laminated one on another. Illustratively, hole injection layers and electron injection layers of all sub-pixels may be connected together to form a common layer, hole transport layers and electron transport layers of all the sub-pixels may be connected together to form a common layer, hole-blocking layers of all the sub-pixels may be connected together to form a common layer, emitting layers and electron blocking layers of adjacent sub-pixels may have a small amount of overlapping, or may be separate from each other.

In an exemplary embodiment, referring to FIGS. 23-26, the pixel definition layer 120 includes a first pixel definition layer 118 and a second pixel definition layer 119, the first pixel definition layer 118 extends along the first direction and is arranged in the second direction, the second pixel definition layer 119 is arranged in the first direction and extends in the first direction. The first pixel definition layer 118 and the second pixel definition layer 119 define an opening region for each sub-pixel within which a light-emitting region of each sub-pixel is located. The first pixel definition layer 118 is located between the base substrate and the second pixel definition layer 119. Illustratively, a height of the second pixel definition layer 119 is greater than a height of the first pixel definition layer 118 in the direction perpendicular to the base substrate.

During a manufacturing process, ink with a light emitting function is dropped into the opening region by using an ink jet printing process, to form an organic film layer of the light-emitting functional layer in the opening region. Since the height of the second pixel definition layer 119 is greater than the height of the first pixel definition layer 118, the ink may flow in opening regions in a column in the second direction during the ink jet printing process, thereby enhancing the fluidity of the ink, averaging the ink content in each opening region, and improving the film formation uniformity of the ink. Also, since the opening regions in the same column in the second direction communicate with each other, sub-pixel units in the same column having a same color may be formed by using the ink-jet printing process.

In an exemplary embodiment, the plurality of sub-pixels is divided into a plurality of repeat units arranged in an array form, each repeat unit includes two sub-units arranged in the first direction, and each sub-unit includes a plurality of sub-pixels arranged in the first direction. For example, the repeat unit includes six sub-pixels arranged in the first direction, and the six sub-pixels include BRGBRG arranged in the first direction, where a group of BRG represents one sub-unit.

In an exemplary embodiment, within the plurality of repeat units, the first pixel-defining layer includes a first pattern H1, the second pixel-defining layer includes a second pattern H2, and an orthographic projection of the second pattern H2 onto the base substrate covers an orthographic projection of the first pattern H1 onto the base substrate.

Figure 23:
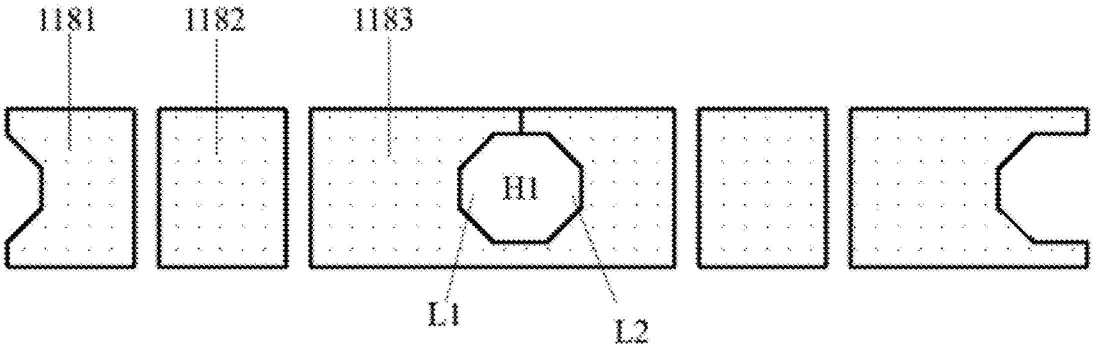
FIG. 23 is a partial schematic view showing patterns of a first pixel definition layer according to an embodiment of the present disclosure.

Based on the above-mentioned arrangement, referring to FIG. 23, in an exemplary embodiment, along the first direction, the first pixel definition layer 118 corresponding to each sub-unit BRG includes a first definition structure 1181, a second definition structure 1182 and a third definition structure 1183 corresponding to each sub-pixel in the sub-unit. Within the repeat unit, pixel definition structures of adjacent sub-pixels in two adjacent sub-units are formed as one piece. For example, the repeat unit includes six sub-pixels BRGBRG, where BRG represents one sub-unit, B in the sub-unit corresponds to a first definition structure, R corresponds to a second definition structure and G corresponds to a third definition structure, and the third definition structure and the first definition structure corresponding to adjacent sub-pixels GB respectively in the adjacent sub-units may be connected to each other to form an integral structure. In at least one repeat unit, the third definition structure corresponding to an adjacent sub-unit includes a first groove L1, and the first definition structure corresponding to another adjacent sub-unit includes a second groove L2, the first groove L1 and the second groove L2 are oppositely oriented and have similar contours as viewed from the top, and the first groove L1 and the second groove L2 form the first pattern H1. The orthographic projection of the first pattern H1 onto the base substrate covers the orthographic projection of the ninth connection member K9 onto the base substrate.

Figure 24:
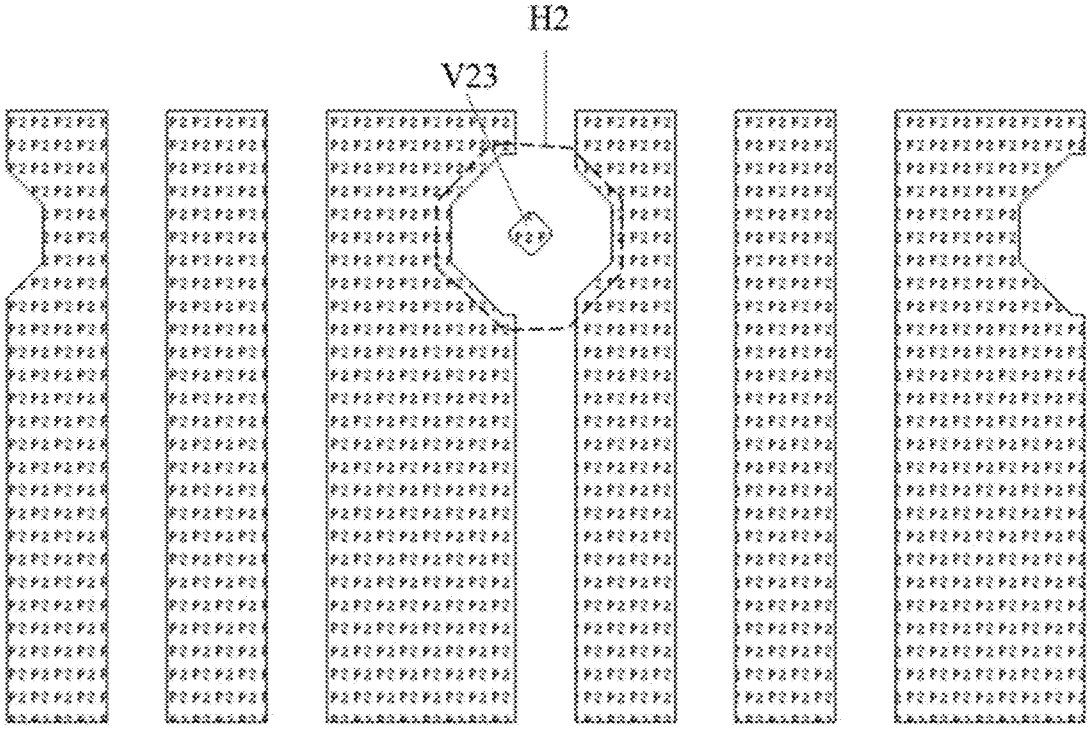
FIG. 24 is a partial schematic view showing patterns of a second pixel definition layer pattern according to an embodiment of the present disclosure.
Figure 25:
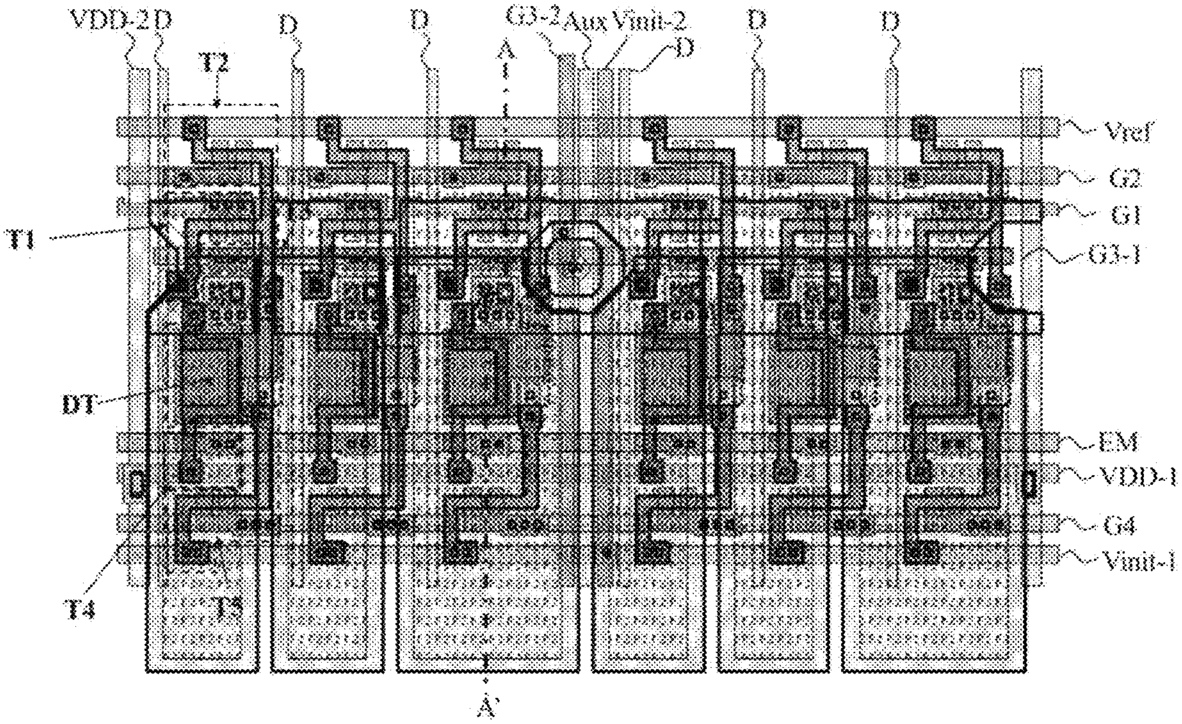
FIG. 25 is a partial schematic view showing a structure where the patterns of the active layer, the patterns of the first conductive layer, the patterns of the second conductive layer pattern, the patterns of the third conductive layer and the patterns of the fourth conductive layer, the patterns of the first electrode layer the patterns of the first pixel definition layer and the patterns of the second pixel definition layer are laminated one on another according to an embodiment of the present disclosure.

Based on the above-mentioned arrangement, referring to FIG. 24, in an exemplary embodiment, the second pixel definition layer 119 corresponding to adjacent sub-units within at least one repeat unit includes the second pattern H2. The second pattern H2 includes a first protrusion T1 facing a first sub-unit and a second protrusion T2 facing a second sub-unit, a contour of the first protrusion T1 is similar to the contour of the first groove L1, and a contour of the second protrusion T2 is similar to the contour of the second recess L2. The orthographic projection of the second pattern H2 onto the base substrate covers the orthographic projection of the first pattern H1 onto the base substrate, e.g., an overlapping region thereof may be located in a central region of the second pattern H2. The second pattern further includes a twenty-third via-hole V23, which may illustratively be located in the center of the second pattern H2, i.e., within the same repeat unit, in the first direction, a distance from the twenty-third via-hole V23 to the first protrusion T1 is equal to a distance from the twenty-third via-hole V23 to the second protrusion T2. In this way, it is able to provide more uniform ink flow on both sides of the second pattern during the ink printing process.

In an exemplary embodiment, the second electrode layer may be connected to the ninth connection member K9 through the twenty-third via-hole V23, so as to realize that the second electrode layer is in contact with the auxiliary electrode Aux. An orthographic projection of the twenty-third via-hole V23 onto the base substrate covers the orthographic projection of the twenty-second via-hole V22 onto the base substrate as viewed from the top. The term "equal to" mentioned in the present disclosure allows for a range of errors, taking into account process error reasons.

An embodiment of the present disclosure further provides a display device including the above-mentioned display substrate. The display means may be any product or member having a display function, such as a television, a display, a digital photo frame, a mobile phone, a tablet computer, and the display device further includes a flexible circuit board, a printed circuit board and a backplane, etc.

It should be appreciated that, the expression "at a same layer" refers to that the film layers are arranged on a same structural layer. Alternatively, for example, the film layers on a same layer may be layer structures formed through forming thin layers for forming specific patterns through a single film-forming process and then patterning the film layers with a same mask through a single patterning process. Depending on different specific patterns, a single patterning process may include multiple exposure, development or etching processes, and the specific patterns in the layer structures may be continuous or discontinuous. These specific patterns may also be arranged at different levels or have different thicknesses.

It should be further appreciated that, the above embodiments have been described in a progressive manner, and the same or similar contents in the embodiments have not been repeated, i.e., each embodiment has merely focused on the difference from the others. Especially, the product embodiments are substantially similar to the method embodiments, and thus have been described in a simple manner.

Although the embodiments disclosed in the present disclosure are as above, the described contents thereof are only used to facilitate the understanding of the present disclosure and are not intended to limit the present invention. Any person skilled in the art can make any modifications and changes in the form and details of the implementation without departing from the spirit and scope of the present disclosure. However, the scope of the present disclosure shall be subject to the scope defined by the appended claims.

What is claimed is:

1. A display substrate, comprising:

a base substrate;

a driving circuit layer comprising pixel units arranged in an array form, at least one of the pixel units comprising a plurality of sub-pixels, wherein at least one of the sub-pixels comprises a pixel driving circuit, and the pixel driving circuit comprises a light-emitting element, a plurality of transistors and a storage capacitor; the plurality of transistors comprises a first transistor and a second transistor, and the first transistor is coupled to the second transistor;

a plurality of scanning lines, wherein the plurality of scanning lines comprises a first scanning line and a second scanning line, both the first scanning line and the second scanning line extend along a first direction and are arranged along a second direction, the first direction is an extension direction of sub-pixels in a row, and the second direction is an extension direction of sub-pixels in a column;

wherein the plurality of transistors comprises one or more active patterns, and an active pattern of each transistor comprises a channel region and a conductive region, wherein an active pattern of the first transistor comprises a first channel region, an active pattern of the second transistor comprises a second channel region, the first channel region is located on a side of the first scanning line away from the second scanning line, and the second channel region is located on a side of the second scanning line away from the first scanning line;

wherein the display substrate further comprises a plurality of signal lines; the plurality of signal lines comprises a first signal line and a second signal line;

the first signal line is coupled to a first electrode of the first transistor; the second signal line is coupled to a first electrode of the second transistor; the first transistor is configured to transmit a voltage signal of the first signal line to a second electrode of the first transistor under control of a first scanning line signal;

the second transistor is configured to transmit a voltage signal of the second signal line to a second electrode of the second transistor under control of a second scanning line signal;

the second electrode of the first transistor and the second electrode of the second transistor are coupled to a first node;

wherein the plurality of scanning lines further comprises a third scanning line, and the plurality of signal lines further comprises a power source line;

the third scanning line comprises a first branch scanning line extending along the first direction and a second branch scanning line extending along the second direction, the first branch scanning line is coupled to the second branch scanning line;

the plurality of transistors further comprises a third transistor and a driving transistor;

the storage capacitor comprises a first electrode plate and a second electrode plate;

a second electrode of the third transistor, a gate electrode of the driving transistor and the first electrode plate of the storage capacitor are coupled to a second node, a gate electrode of the third transistor is coupled to the third scanning line, and a first electrode of the third transistor is coupled to the first node; the third transistor is configured to transmit a voltage of the first node to the second node under control of a third scanning line signal;

for sub-pixels in a same row, the first branch scanning line is located on the side of the first scanning line away from the second scanning line.

2. The display substrate according to claim 1, wherein the plurality of transistors further comprises a fourth transistor and a fifth transistor; the plurality of scanning lines further comprises a light-emitting scanning line and a fourth scanning line; the plurality of signal lines further comprises a third signal line;

the light-emitting scanning line extends along the first direction;

a gate electrode of the fourth transistor is coupled to the light-emitting scanning line, a first electrode of the fourth transistor is coupled to the power source line, and a second electrode of the fourth transistor is coupled to a first electrode of the driving transistor; the fourth transistor is configured to transmit a voltage signal from the power source line to a second electrode of the driving transistor under control of a light-emitting scanning line signal;

a gate electrode of the fifth transistor is coupled to the fourth scanning line, a first electrode of the fifth transistor is coupled to the third signal line, and a second electrode of the fifth transistor is coupled to the light-emitting element; the fifth transistor is configured to transmit a voltage signal of the third signal line to the light-emitting element under control of a fourth scanning line signal.

3. The display substrate according to claim 2, wherein the power source line comprises a first power source line extending along the first direction and a second power source line extending along the second direction, and the first power source line is coupled to the second power source line; for the sub-pixels in the same row, the first power source line is located on a side of the light-emitting scanning line away from the first scanning line;

the third signal line comprises a first sub-line extending along the first direction and a second sub-line extending along the second direction, and the first sub-line is coupled to the second sub-line;

the fourth scanning line extends along the first direction, and for the sub-pixels in the same row, the fourth scanning line is located on a side of the first power source line away from the light-emitting scanning line;

the first sub-line is located on a side of the fourth scanning line away from the first scanning line.

4. The display substrate according to claim 1, wherein pixel driving circuits of the plurality of sub-pixels are arranged in M*N, wherein M and N are each a positive integer greater than or equal to 1; at least two sub-pixels in a same column are coupled to a same first signal line.

5. The display substrate according to claim 4, wherein the display substrate further comprises a plurality of control regions, and at least one control region comprises at least one repeat unit;

the third scanning line is coupled to a the gate electrode of a the third transistor in each repeat unit for controlling the turn-on or turn-off of the third transistor in each repeat unit in a corresponding control region;

along the first direction, in a same control region, first branch scanning lines coupled to sub-pixels respectively in the repeat unit are coupled to each other; and first branch scanning lines are disconnected from each other between the control regions.

6. The display substrate according to claim 5, wherein an orthographic projection of the second power source line onto the base substrate does not overlap an orthographic projection of the first branch scanning line onto the base substrate; and/or, wherein an orthographic projection of the first power source line onto the base substrate overlaps an orthographic projection of the second branch scanning line onto the base substrate.

7. The display substrate according to claim 5, wherein in a direction perpendicular to the base substrate, the driving circuit layer comprises an active layer, a first conductive layer, a second conductive layer, a third conductive layer and a fourth conductive layer which are arranged sequentially on the base substrate;

the active layer comprises the active patterns of the plurality of transistors, and the active pattern comprises the channel region and the conductive region;

the first conductive layer comprises gate electrodes of the plurality of transistors, the second branch scanning line and the second sub-line;

the second conductive layer comprises a second electrode plate of the storage capacitor;

the third conductive layer comprises the first scanning line, the second scanning line, the first branch scanning line, the light-emitting scanning line, the fourth scanning line, the second signal line, the first power source line and the first sub-line;

the fourth conductive layer comprises the first signal line and the second power source line.

8. The display substrate according to claim 7, wherein a spacing between the second signal line and the second scanning line is greater than or equal to a spacing between the first scanning line and the second scanning line;

and/or, wherein an interlayer insulation layer is arranged between the second conductive layer and the third conductive layer, wherein the interlayer insulation layer comprises a first via-hole structure, and the first via-hole structure comprises a first via-hole and a second via-hole;

an orthographic projection of a gate electrode of the first transistor onto the base substrate at least partially overlaps an orthographic projection of the first scanning line onto the base substrate at a first overlapping region; an orthographic projection of the first via-hole onto the base substrate is in the first overlapping region;

an orthographic projection of a gate electrode of the second transistor onto the base substrate at least partially overlaps an orthographic projection of the second scanning line onto the base substrate at a second overlapping region; an orthographic projection of the second via-hole onto the base substrate is in the second overlapping region;

a distance between the first via-hole and the second via-hole is greater than a distance between the first scanning line and the second scanning line.

9. The display substrate according to claim 8, wherein the first branch scanning line comprises a first connection member, and for sub-pixels in the same row, the first connection member is located on a side of the first branch scanning line away from the light-emitting scanning line;

the first via-hole structure comprises a ninth via-hole, the second branch scanning line is coupled to the first branch scanning line through the ninth via-hole, and an orthographic projection of the ninth via-hole onto the base substrate is within an orthographic projection of the first connection member onto the base substrate.

10. The display substrate according to claim 9, wherein the first electrode plate of the storage capacitor comprises a first electrode sub-plate and a second electrode sub-plate, wherein the first electrode sub-plate is located in the first conductive layer, and the second electrode sub-plate is located in the third conductive layer; the third conductive layer comprises a second connection member;

the first via-hole structure comprises a fifteenth via-hole and a sixteenth via-hole, the second electrode sub-plate is coupled to the first electrode sub-plate through the fifteenth via-hole, and the second electrode sub-plate is coupled to the second node through the sixteenth via-hole;

orthographic projections of the fifteenth via-hole and the sixteenth via-hole onto the base substrate are within an orthographic projection of the second connection member onto the base substrate.

11. The display substrate according to claim 10, further comprising a first organic layer arranged on a side of the third conductive layer away from the base substrate, wherein the first organic layer comprises a second via-hole structure, the first via-hole structure comprises a twelfth via-hole, and the second via-hole structure comprises an eighteenth via-hole;

the first signal line is coupled to the first electrode of the first transistor through the twelfth via-hole and the eighteenth via-hole, wherein there is an overlapping region in orthographic projections of the eighteenth via-hole and the twelfth via-hole onto the base substrate;

the third conductive layer further comprises a third connection member, and an orthographic projection of the third connection member onto the base substrate covers the orthographic projections of the eighteenth via-hole and the twelfth via-hole onto the base substrate.

12. The display substrate according to claim 11, wherein the second via-hole structure comprises a twentieth via-hole, and the second power source line is coupled to the first power source line through the twentieth via-hole;

the first power source line comprises a fourth connection member, and for the sub-pixels in the same row, the fourth connection member is located on a side of the first power source line close to the fourth scanning line;

an orthographic projection of the twentieth via-hole onto the base substrate partially overlaps an orthographic projection of the fourth connection member onto the base substrate;

wherein a width of the twentieth via-hole along the first direction is less than a width of the twentieth via-hole along the second direction.

13. The display substrate according to claim 7, comprising a light-emitting element layer on a side of the fourth conductive layer away from the base substrate; the light-emitting element layer comprises a first electrode layer, a pixel definition layer, a light-emitting functional layer and a second electrode layer, wherein the first electrode layer comprises a plurality of first electrodes corresponding to the plurality of sub-pixels respectively.

14. The display substrate according to claim 13, further comprising a second organic layer arranged on a side of the fourth conductive layer away from the base substrate, wherein the second organic layer comprises a fourth via-hole structure, the fourth via-hole structure comprises a twenty-first via-hole, and the plurality of first electrodes are coupled to the seventh connection member through the twenty-first via-hole, to enable the second electrode plate of the storage capacitor to be coupled to a second electrode of the driving transistor;

wherein the fourth conductive layer further comprises an auxiliary electrode, the auxiliary electrode comprises an eighth connection member, and the eighth connection member is located on a left side of the auxiliary electrode from a top view of the display substrate.

15. The display substrate according to claim 14, wherein the pixel definition layer comprises a first pixel definition layer and a second pixel definition layer, the first pixel definition layer is arranged in the first direction and extends along the second direction, the first pixel definition layer and the second pixel definition layer define an opening region of each sub-pixel, and a light-emitting region of each sub-pixel is located in the opening region; a height of the second pixel definition layer is greater than a height of the first pixel definition layer in the direction perpendicular to the base substrate.

16. The display substrate according to claim 15, wherein the plurality of sub-pixels is divided into a plurality of repeat units arranged in an array form, wherein each repeat unit comprises two sub-units arranged in the first direction, and each sub-unit comprises a plurality of sub-pixels arranged in the first direction; within the repeat unit, pixel definition structures of adjacent sub-pixels in two adjacent sub-units are an integral structure.

17. The display substrate according to claim 16, wherein within the plurality of repeat units, the first pixel definition layer comprises a first pattern, and the second pixel definition layer comprises a second pattern, and an orthographic projection of the second pattern onto the base substrate covers an orthographic projection of the first pattern onto the base substrate;

wherein the fourth via-hole structure comprises a twenty-second via-hole, the second pattern comprises a twenty-third via-hole, and the second electrode layer is coupled to the auxiliary electrode through the twenty-third via-hole and the twenty-second via-hole;

an orthographic projection of the twenty-third via-hole onto the base substrate covers an orthographic projection of the twenty-second via-hole onto the base substrate.

18. The display substrate according to claim 17, wherein the first electrode layer comprises a ninth connection member, and an orthographic projection of the eighth connection member onto the base substrate is within an orthographic projection of the ninth connection member onto the base substrate; and the orthographic projection of the eighth connection member onto the base substrate covers the twenty-second via-hole;

wherein the twenty-third via-hole is located at a center of the second pattern.

* * * * *